United States Patent
Jiang et al.

(10) Patent No.: US 11,304,231 B2
(45) Date of Patent: Apr. 12, 2022

(54) METHOD AND DEVICE IN UE AND BASE STATION FOR WIRELESS COMMUNICATION

(71) Applicants: Qi Jiang, Shanghai (CN); XiaoBo Zhang, Shanghai (CN); Lin Yang, Shanghai (CN)

(72) Inventors: Qi Jiang, Shanghai (CN); XiaoBo Zhang, Shanghai (CN); Lin Yang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 262 days.

(21) Appl. No.: 16/435,564

(22) Filed: Jun. 10, 2019

(65) Prior Publication Data

US 2019/0380149 A1 Dec. 12, 2019

(30) Foreign Application Priority Data

Jun. 11, 2018 (CN) .......................... 201810593357.3

(51) Int. Cl.
| | | |
|---|---|---|
| *H04W 74/08* | (2009.01) | |
| *H04L 27/26* | (2006.01) | |
| *H04L 5/00* | (2006.01) | |
| *H04W 72/12* | (2009.01) | |
| *H04W 72/04* | (2009.01) | |

(52) U.S. Cl.
CPC ......... *H04W 74/0816* (2013.01); *H04L 5/001* (2013.01); *H04L 27/2602* (2013.01); *H04W 72/1205* (2013.01); *H04W 72/0446* (2013.01); *H04W 72/0453* (2013.01)

(58) Field of Classification Search
CPC ... H04L 5/0053; H04L 27/2602; H04L 5/001; H04L 5/0094; H04L 5/0007; H04W 74/0816; H04W 72/1205; H04W 72/0453; H04W 72/0446
See application file for complete search history.

(56) References Cited

U.S. PATENT DOCUMENTS

| | | | |
|---|---|---|---|
| 11,129,152 B2* | 9/2021 | You ..................... | H04W 72/042 |
| 2017/0223670 A1* | 8/2017 | Chen .................... | H04L 5/0048 |
| 2018/0309489 A1* | 10/2018 | Hosseini .............. | H04L 5/0053 |
| 2019/0132845 A1* | 5/2019 | Babaei ................ | H04W 72/042 |
| 2019/0245658 A1* | 8/2019 | Yang ....................... | H04L 1/00 |

(Continued)

*Primary Examiner* — Mehmood B. Khan

(57) ABSTRACT

A method and a device in a UE and a base station for wireless communication are disclosed. The UE monitors a first sequence in a first time window. If the first sequence is detected in the first time window, performs a blind detection of a first signaling on K1 alternative RE set(s); the first signaling occupies one of K1 alternative RE set(s) in time-frequency domain, each RE included in K1 alternative RE set(s) belongs to an alternative time-frequency resource pool in a second time window in time domain. The first sequence is used for determining a start time of the alternative time-frequency resource pool in the second time window. The disclosure determines the start time of the alternative time-frequency resource pool by using the first sequence, increasing transmitting opportunities of control signalings without increasing number of times of blind detections, improving spectrum efficiency and overall system performance on unlicensed spectrum.

16 Claims, 14 Drawing Sheets

(56) References Cited

U.S. PATENT DOCUMENTS

| | | | |
|---|---|---|---|
| 2021/0014893 A1* | 1/2021 | Park | H04L 5/0092 |
| 2021/0029552 A1* | 1/2021 | Murayama | H04W 72/0453 |
| 2021/0083828 A1* | 3/2021 | Matsuda | H04W 72/04 |
| 2021/0092622 A1* | 3/2021 | Tiirola | H04L 1/0038 |
| 2021/0127412 A1* | 4/2021 | Babaei | H04W 72/1273 |

* cited by examiner

METHOD AND DEVICE IN UE AND BASE STATION FOR WIRELESS COMMUNICATION

CROSS-REFERENCE TO RELATED APPLICATION

This application claims the priority benefit of Chinese Patent Application Serial Number 201810593357.3 filed on Jun. 11, 2018, the full disclosure of which is incorporated herein by reference.

BACKGROUND

Technical Field

The disclosure relates to transmission methods and devices in wireless communication systems, and in particular to a method and a device for transmission of data and control channels on unlicensed spectrum.

Related Art

In conventional 3rd Generation Partner Project (3GPP) Long Term Evolution (LTE) systems, data transmission can occur on licensed spectrum only. However, with the increasing diversification of application scenarios and the sharp increase of services, the conventional licensed spectrum probably is difficult to meet the requirements of the services. In LTE Release 13 and Release 14, communication on unlicensed spectrum is introduced to cellular systems and it is applied to transmissions of uplink data and downlink data.

In LTE Licensed Assisted Access (LAA) design mechanism, a transmitter (base station or User Equipment (UE)) needs to perform Listen Before Talk (LBT) before transmitting data on unlicensed spectrum, so as to avoid causing interferences to other wireless transmissions that are ongoing on unlicensed spectrum. However, in present NR systems, Control Resource Sets (CORESETs) for transmitting Physical Downlink Control Channel (PDCCH) are all configured through a Radio Resource Control (RRC) signaling. Due to the existence of LBT, the base station does not know whether the LBT can succeed or not before transmitting the PDCCH, that is to say, the base station cannot predict correctly, before completing the LBT, whether the PDCCH can be transmitted.

SUMMARY

In 5G LAA, if no enhancement is performed to the existing LAA operating mode, that is to say, time-frequency resources occupied by a CORESET are configured still through an RRC signaling. In 5G NR (New Radio Access Technology) systems, generally, a CORESET occupies a positive integer number of initial multicarrier symbols of one slot. Under such condition, if the base station has an LBT failed before one CORESET, the base station loses the opportunity of transmitting scheduling signalings in the slot in which the CORESET is located. One simple solution to the above problem is that: multiple CORESETs are configured on multiple multicarrier symbols in one slot respectively, and the multiple multicarrier symbols are discrete. This approach can potentially add multiple start time points for LBT, thereby realizing the possibility of acquiring multiple downlink transmitting opportunities. However, this approach has an obvious problem, that is, the configuration of multiple CORESETs will increase the number of times of blind detections performed by a user, moreover, due to LBT, partial CORESETs among the multiple CORESETs cannot be used, but the user still needs to perform blind detections of the multiple CORESETs. This would increase the probability of false alarms of PDCCH, thereby impacting PDCCH performances.

On the basis of the above problems and analyses, the disclosure provides a solution. The embodiments of the UE of the disclosure and the characteristics in the embodiments may be applied to the base station if no conflict is incurred, and vice versa. The embodiments of the disclosure and the characteristics in the embodiments may be mutually combined if no conflict is incurred.

The disclosure provides a method in a UE for wireless communication, wherein the method includes:
    monitoring a first sequence in a first time window; and
    if the first sequence is detected in the first time window, performing a blind detection of a first signaling on K1 alternative Resource Element (RE) set(s).

Herein, the first signaling occupies one of the K1 alternative RE set(s) in time-frequency domain, any one of the K1 alternative RE set(s) includes a positive integer number of RE(s), each RE included in the any one of the K1 alternative RE set(s) belongs to an alternative time-frequency resource pool, the alternative time-frequency resource pool belongs to a second time window in time domain, the first sequence is used for determining a start time of the alternative time-frequency resource pool in the second time window, and a time domain position of the first time window is related to a time domain position of the second time window; the first signaling is a physical layer signaling; and the K1 is a positive integer.

In one embodiment, the above method has a following benefit: the start time of the alternative time-frequency resource pool is indicated dynamically through the first sequence, which realizes a feature that a search space of the UE changes dynamically, so as to match with the time when the LBT at the base station succeeds, thereby increasing the scheduling opportunities of the UE in one slot or one subframe.

In one embodiment, the above method has another following benefit: the above design enables PDCCH candidates which the UE actually needs to perform blind detections of to dynamically translate in time domain with the transmitting time of the first sequence, thus avoiding increasing scheduling opportunities by increasing the number of times of blind detections. This approach reduces the complexity at the terminal side.

In one embodiment, the above method has yet another following benefit: the start time of the alternative time-frequency resource pool is indicated through the first sequence, that is so say, the first sequence is demodulated by means of coherent detection or energy detection rather than channel decoding, thus, the robustness of demodulation of the first sequence is increased, and the complexity of demodulation of the first sequence by the terminal side is reduced.

According to one aspect of the disclosure, the above method includes:
    operating a first radio signal.
    Herein, the operating is receiving, or the operating is transmitting; the first signaling includes a first configuration information group for the first radio signal, and the first configuration information group includes at least one of positions of occupied time domain resources, positions of occupied frequency domain resources, or a Modulation and Coding Scheme (MCS).

According to one aspect of the disclosure, the above method is characterized in that: the monitoring of the first sequence is a correlation detection, or the monitoring of the first sequence is an energy detection.

According to one aspect of the disclosure, the above method includes:

receiving a second signaling.

Herein, the second signaling is used for determining a target time-frequency resource pool, the target time-frequency resource pool includes K2 target RE sets, any one of the K1 alternative RE set(s) is one of the K2 target RE sets; and the K2 is a positive integer greater than the K1.

In one embodiment, the above method has a following benefit: time-frequency positions of REs occupied by any one of the K2 target RE sets are configured semi-statically through a higher layer signaling, and the UE just determines the K1 alternative RE set(s) from the K2 target RE sets dynamically through the first sequence; the above approach does not change the existing configuration mode of CORESET, and can implement the scheme in the disclosure through simple upgrades on the basis of existing systems.

According to one aspect of the disclosure, the above method is characterized in that: a maximum number of blind detections of the first signaling performed by the UE in the first time window is equal to X1; and the X1 is a positive integer less than the K2 but not greater than the K1.

In one embodiment, the above method has a following benefit: PDCCH candidate(s) corresponding to the K1 alternative RE set(s) change(s) dynamically with the indication of the first sequence, K1 being not greater than X1, so as to achieve the technical effect of increasing scheduling opportunities without increasing the number of times of blind detections performed by the UE in the first time window.

According to one aspect of the disclosure, the above method includes:

receiving a third signaling.

Herein, the third signaling is used for determining L1 candidate time units, and the L1 candidate time units all belong to the first time window; time domain resources occupied by the first sequence belong to one of the L1 candidate time units; and the UE monitors the first sequence in the L1 candidate time units.

In one embodiment, the above method has a following benefit: time-frequency resource positions where the first sequence needs to be monitored are preconfigured, that is, the L1 candidate time units are preconfigured. The complexity of detection of the first sequence by the UE is reduced.

According to one aspect of the disclosure, the above method is characterized in that: a first identifier is used for determining the K1 alternative RE set(s) from the alternative time-frequency resource pool.

In one embodiment, the above method has a following benefit: The existing method to search PDCCH candidates in one CORESET is employed, that is to say, time-frequency positions of REs occupied by PDCCH candidates are determined through a Radio Network Temporary Identifier (RNTI). The forward compatibility of the scheme proposed in the disclosure is improved.

The disclosure provides a method in a base station for wireless communication, wherein the method includes:

transmitting a first sequence in a first time window; and
transmitting a first signaling on one of K1 alternative RE set(s).

Herein, any one of the K1 alternative RE set(s) includes a positive integer number of RE(s), each RE included in the any one of the K1 alternative RE set(s) belongs to an alternative time-frequency resource pool, the alternative time-frequency resource pool belongs to a second time window in time domain, the first sequence is used for determining a start time of the alternative time-frequency resource pool in the second time window, and a time domain position of the first time window is related to a time domain position of the second time window; the first signaling is a physical layer signaling; and the K1 is a positive integer.

According to one aspect of the disclosure, the above method includes:

processing a first radio signal.

Herein, the processing is transmitting, or the processing is receiving; the first signaling includes a first configuration information group for the first radio signal, and the first configuration information group includes at least one of positions of occupied time domain resources, positions of occupied frequency domain resources, or an MCS.

According to one aspect of the disclosure, the above method is characterized in that: the monitoring of the first sequence is a correlation detection, or the monitoring of the first sequence is an energy detection.

According to one aspect of the disclosure, the above method includes:

transmitting a second signaling.

Herein, the second signaling is used for determining a target time-frequency resource pool, the target time-frequency resource pool includes K2 target RE sets, any one of the K1 alternative RE set(s) is one of the K2 target RE sets; and the K2 is a positive integer greater than the K1.

According to one aspect of the disclosure, the above method is characterized in that: a receiver of the first signaling includes a first terminal, and a maximum number of blind detections of the first signaling performed by the first terminal in the first time window is equal to X1; and the X1 is a positive integer less than the K2 but not greater than the K1.

According to one aspect of the disclosure, the above method includes:

transmitting a third signaling.

Herein, the third signaling is used for determining L1 candidate time units, and the L1 candidate time units all belong to the first time window; time domain resources occupied by the first sequence belong to one of the L1 candidate time units; a receiver of the first signaling includes a first terminal, and the first terminal monitors the first sequence in the L1 candidate time units.

According to one aspect of the disclosure, the above method is characterized in that: a first identifier is used for determining the K1 alternative RE set(s) from the alternative time-frequency resource pool.

According to one aspect of the disclosure, the above method includes:

performing an energy detection of a first frequency band.

Herein, the energy detection is used for determining that the first frequency band is unoccupied, and frequency domain resources occupied by the first signaling belong to the first frequency band.

The disclosure provides a UE for wireless communication, wherein the UE includes:

a first receiver, to monitor a first sequence in a first time window; and a first transceiver, if the first sequence is detected in the first time window, to perform a blind detection of a first signaling on K1 alternative RE set(s).

Herein, the first signaling occupies one of the K1 alternative RE set(s) in time-frequency domain, any one of the K1 alternative RE set(s) includes a positive integer number of RE(s), each RE included in the any one of the K1 alternative RE set(s) belongs to an alternative time-frequency resource pool, the alternative time-frequency resource pool belongs to a second time window in time domain, the first sequence is used for determining a start time of the alternative time-frequency resource pool in the second time window, and a time domain position of the first time window is related to a time domain position of the second time window; the first signaling is a physical layer signaling; and the K1 is a positive integer.

In one embodiment, the above UE for wireless communication is characterized in that: the first transceiver further operates a first radio signal; the operating is receiving, or the operating is transmitting; the first signaling includes a first configuration information group for the first radio signal, and the first configuration information group includes at least one of positions of occupied time domain resources, positions of occupied frequency domain resources, or an MCS In one embodiment, the above UE for wireless communication is characterized in that: the monitoring of the first sequence is a correlation detection, or the monitoring of the first sequence is an energy detection.

In one embodiment, the above UE for wireless communication is characterized in that: the first receiver further receives a second signaling; the second signaling is used for determining a target time-frequency resource pool, the target time-frequency resource pool includes K2 target RE sets, any one of the K1 alternative RE set(s) is one of the K2 target RE sets; and the K2 is a positive integer greater than the K1.

In one embodiment, the above UE for wireless communication is characterized in that: a maximum number of blind detections of the first signaling performed by the UE in the first time window is equal to X1; and the X1 is a positive integer less than the K2 but not greater than the K1.

In one embodiment, the above UE for wireless communication is characterized in that: the first receiver further receives a third signaling; the third signaling is used for determining L1 candidate time units, and the L1 candidate time units all belong to the first time window; time domain resources occupied by the first sequence belong to one of the L1 candidate time units; and the UE monitors the first sequence in the L1 candidate time units.

In one embodiment, the above UE for wireless communication is characterized in that: a first identifier is used for determining the K1 alternative RE set(s) from the alternative time-frequency resource pool.

The disclosure provides a base station for wireless communication, wherein the base station includes:

a second transceiver, to transmit a first sequence in a first time window; and a third transceiver, to transmit a first signaling on one of K1 alternative RE set(s).

Herein, any one of the K1 alternative RE set(s) includes a positive integer number of RE(s), each RE included in the any one of the K1 alternative RE set(s) belongs to an alternative time-frequency resource pool, the alternative time-frequency resource pool belongs to a second time window in time domain, the first sequence is used for determining a start time of the alternative time-frequency resource pool in the second time window, and a time domain position of the first time window is related to a time domain position of the second time window; the first signaling is a physical layer signaling; and the K1 is a positive integer.

In one embodiment, the above base station for wireless communication is characterized in that: the third transceiver further processes a first radio signal; the processing is transmitting, or the processing is receiving; the first signaling includes a first configuration information group for the first radio signal, and the first configuration information group includes at least one of positions of occupied time domain resources, positions of occupied frequency domain resources, or an MCS.

In one embodiment, the above base station for wireless communication is characterized in that: the monitoring of the first sequence is a correlation detection, or the monitoring of the first sequence is an energy detection.

In one embodiment, the above base station for wireless communication is characterized in that: the second transceiver further transmits a second signaling; the second signaling is used for determining a target time-frequency resource pool, the target time-frequency resource pool includes K2 target RE sets, any one of the K1 alternative RE set(s) is one of the K2 target RE sets; and the K2 is a positive integer greater than the K1.

In one embodiment, the above base station for wireless communication is characterized in that: a receiver of the first signaling includes a first terminal, and a maximum number of blind detections of the first signaling performed by the first terminal in the first time window is equal to X1; and the X1 is a positive integer less than the K2 but not greater than the K1.

In one embodiment, the above base station for wireless communication is characterized in that: the second transceiver further transmits a third signaling; wherein the third signaling is used for determining L1 candidate time units, and the L1 candidate time units all belong to the first time window; time domain resources occupied by the first sequence belong to one of the L1 candidate time units; a receiver of the first signaling includes a first terminal, and the first terminal monitors the first sequence in the L1 candidate time units.

In one embodiment, the above base station for wireless communication is characterized in that: a first identifier is used for determining the K1 alternative RE set(s) from the alternative time-frequency resource pool.

In one embodiment, the above base station for wireless communication is characterized in that: the second transceiver further performs an energy detection of a first frequency band; the energy detection is used for determining that the first frequency band is unoccupied, and frequency domain resources occupied by the first signaling belong to the first frequency band.

In one embodiment, compared with conventional schemes, the disclosure has the following advantages.

The start time of the alternative time-frequency resource pool is indicated dynamically through the first sequence, which realizes that a search space of the UE changes dynamically, so as to match with the time when the LBT at the base station succeeds, thereby increasing the scheduling opportunities of the UE in one slot or one subframe.

The above design enables PDCCH candidates which the UE actually need to perform blind detections of to dynamically translate in time domain with the transmitting time of the first sequence, thus avoiding increasing scheduling opportunities by increasing the number of times of blind detections. This approach reduces the complexity at the terminal side.

The start time of the alternative time-frequency resource pool is indicated through the first sequence, that is so say, the first sequence is demodulated by means of coherent detection or energy detection rather than channel decoding, thus, the robustness of demodulation of the first sequence is increased, and the complexity of demodulation of the first sequence by the terminal side is reduced.

Time-frequency positions of REs occupied by any one of the K2 target RE sets are configured semi-statically through a higher layer signaling, and the UE just determines the K1 alternative RE set(s) from the K2 target RE sets dynamically through the first sequence; the above approach does not change the existing configuration mode of CORESET, and can implement the scheme in the disclosure through simple upgrades on the basis of existing systems. PDCCH candidate(s) corresponding to the K1 alternative RE set(s) change(s) dynamically with the indication of the first sequence, K1 being not greater than X1, so as to achieve the technical effect of increasing scheduling opportunities in the first time window without increasing the number of times of blind detections in the first time window.

Time-frequency resource positions where the first sequence needs to be monitored are preconfigured, that is, the L1 candidate time units are preconfigured. The complexity of detection of the first sequence by the UE is reduced. The existing method to search PDCCH candidates in one CORESET is employed, that is to say, time-frequency positions of REs occupied by PDCCH candidates are determined through an RNTI. The forward compatibility of the scheme proposed in the disclosure is improved.

BRIEF DESCRIPTION OF THE DRAWINGS

Other features, purposes and advantages of the disclosure will become more apparent from the detailed description of non-restrictive embodiments taken in conjunction with the following drawings.

DESCRIPTION OF THE EMBODIMENTS

The technical scheme of the disclosure is described below in further detail in conjunction with the drawings. It should be noted that the embodiments in the disclosure and the characteristics of the embodiments may be arbitrarily combined if no conflict is incurred.

Embodiment 1

Figure 1:
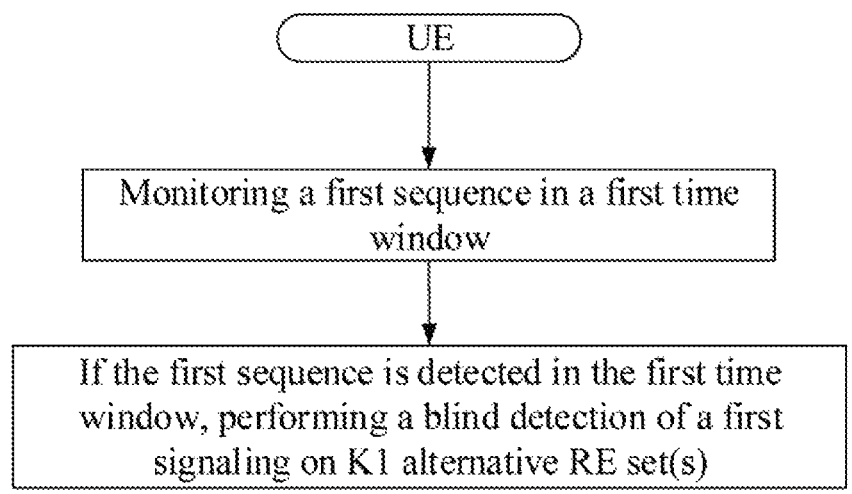
FIG. 1 is a flowchart of a first sequence according to one embodiment of the disclosure.

Embodiment 1 illustrates an example of a flowchart of a first sequence, as shown in FIG. 1.

In Embodiment 1, the UE in the disclosure first monitors a first sequence in a first time window; if the first sequence is detected in the first time window, the UE subsequently performs a blind detection of a first signaling on K1 alternative RE set(s); wherein the first signaling occupies one of the K1 alternative RE set(s) in time-frequency domain, any one of the K1 alternative RE set(s) includes a positive integer number of RE(s), each RE included in the any one of the K1 alternative RE set(s) belongs to an alternative time-frequency resource pool, the alternative time-frequency resource pool belongs to a second time window in time domain, the first sequence is used for determining a start time of the alternative time-frequency resource pool in the second time window, and a time domain position of the first time window is related to a time domain position of the second time window; the first signaling is a physical layer signaling; and the K1 is a positive integer.

In one embodiment, the first time window is a slot.

In one embodiment, the first time window is a subframe.

In one embodiment, the first time window is a mini-slot.

In one embodiment, the first time window occupies a positive integer number of consecutive multicarrier symbols in time domain.

In one embodiment, the first sequence is a Wake-Up Signal (WUS).

In one embodiment, the first sequence is generated by a signature sequence.

In one embodiment, the first sequence is generated by a synchronization sequence.

In one embodiment, the first sequence is generated by at least one of a Primary Synchronization Signal (PSS) and a Secondary Synchronization Signal (SSS).

In one embodiment, the first sequence includes a Discovery Reference Signal (DRS).

In one embodiment, the first sequence includes at least one of a PSS and an SSS.

In one embodiment, any one of the K1 alternative RE set(s) includes Q1 Control Channel Element(s) (CCE(s)), the K1 being a positive integer.

In one subembodiment, the Q1 is equal to one of 1, 2, 4, 8 or 16.

In one subembodiment, time domain resources occupied by the first time window include time domain resources occupied by the second time window, and the Q1 has a value related to a time domain position of the start time of the alternative time-frequency resource pool in the first time window.

In one embodiment, any one of the K1 alternative RE set(s) is one PDCCH candidate corresponding to one time of blind detection of the first signaling.

In one embodiment, any one of the K1 alternative RE set(s) is one CCE.

In one embodiment, the alternative time-frequency resource pool includes a positive integer number of CORESETs.

In one embodiment, the alternative time-frequency resource pool includes frequency domain resources occupied by F1 Resource Block(s) (RB(s)) in frequency domain, and the alternative time-frequency resource pool includes T1 multicarrier symbol(s) in time domain, wherein the F1 and the T1 are both positive integers.

In one subembodiment, the T1 multicarrier symbols include at least two multicarrier symbols that are not consecutive in time domain.

In one embodiment, the alternative time-frequency resource pool includes partial of time domain resources occupied by one CORESET.

In one embodiment, the phrase that the first sequence is used for determining a start time of the alternative time-frequency resource pool in the second time window refers that: the first sequence is detected by the UE in a first multicarrier symbol, and the start time of the alternative time-frequency resource pool is a second multicarrier symbol; the first multicarrier symbol belongs to the first time window, and the second multicarrier symbol belongs to the second time window; and the first multicarrier symbol is used for determining the second multicarrier symbol.

In one subembodiment, the phrase that the first multicarrier symbol is used for determining the second multicarrier symbol refers that: the first multicarrier symbol and the second multicarrier symbol are one same multicarrier symbol.

In one subembodiment, the phrase that the first multicarrier symbol is used for determining the second multicarrier symbol refers that: the first multicarrier symbol and the second multicarrier symbol are two multicarrier symbols adjacent in time domain, and the first multicarrier symbol is located before the second multicarrier symbol.

In one subembodiment, the phrase that the first multicarrier symbol is used for determining the second multicarrier symbol refers that: the second multicarrier symbol is one of P1 multicarrier symbols, the P1 being a positive integer greater than 1; the second multicarrier symbol is the multicarrier symbol among the P1 multicarrier symbols which is located behind the first multicarrier symbol and has a minimum interval in time domain to the first multicarrier symbol; and time domain positions of the P1 multicarrier symbols are determined through a higher layer signaling.

In one embodiment, the phrase that a time domain position of the first time window is related to a time domain position of the second time window refers that: time domain resources occupied by the first time window include time domain resources occupied by the second time window.

In one embodiment, the phrase that a time domain position of the first time window is related to a time domain position of the second time window refers that: a start time of the second time window in time domain is not earlier than an end time when the first sequence is detected in the first time window.

In one embodiment, the second time window occupies a positive integer number of consecutive multicarrier symbols in time domain.

In one embodiment, the multicarrier symbol in the disclosure is one of an Orthogonal Frequency Division Multiplexing (OFDM) symbol, a Single-Carrier Frequency Division Multiple Access (SC-FDMA) symbol, a Filter Bank Multi Carrier (FBMC) symbol, an OFDM symbol including a Cyclic Prefix (CP), and a Discrete Fourier Transform Spreading Orthogonal Frequency Division Multiplexing (DFT-s-OFDM) symbol including a CP.

Embodiment 2

Figure 2:
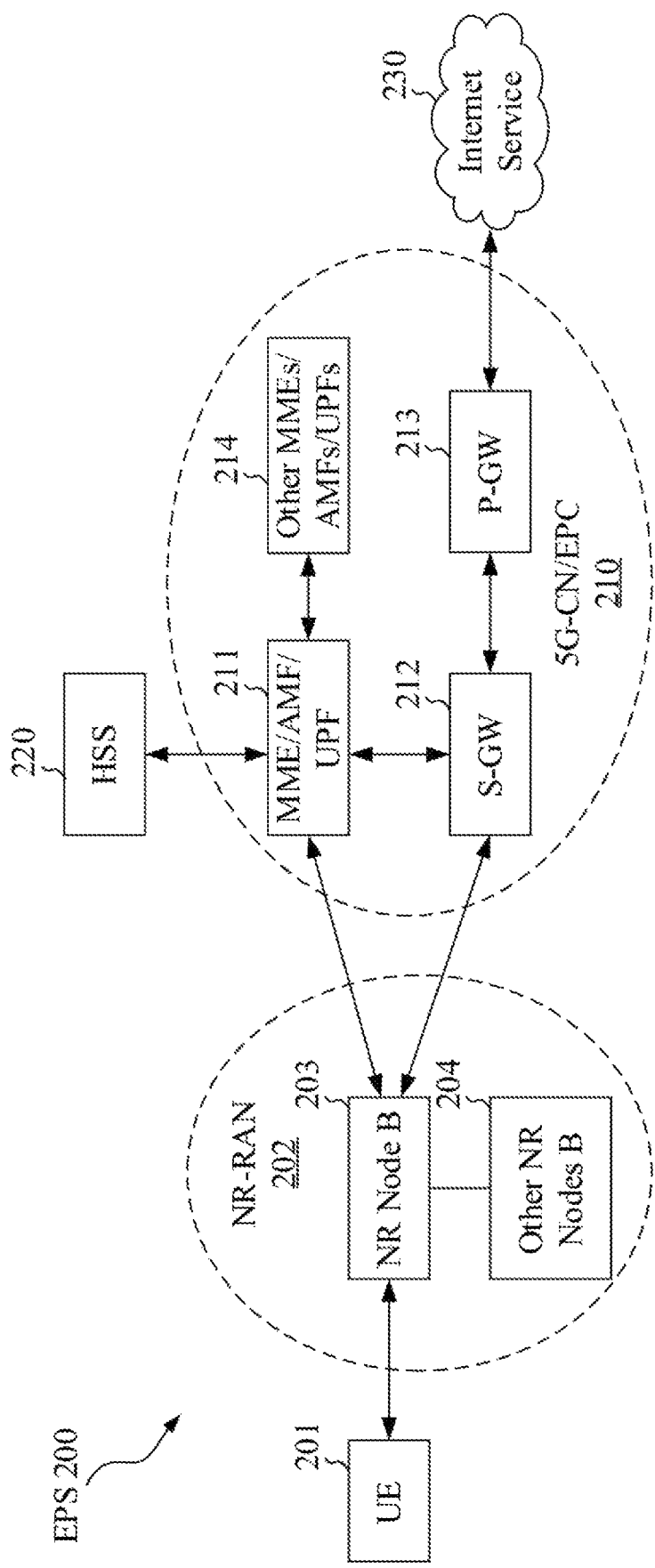
FIG. 2 is a diagram illustrating a network architecture according to one embodiment of the disclosure.

Embodiment 2 illustrates an example of a diagram of a network architecture, as shown in FIG. 2.

Embodiment 2 illustrates an example of a diagram of a network architecture according to the disclosure, as shown in FIG. 2. FIG. 2 is a diagram illustrating a network architecture 200 of NR LTE and Long-Term Evolution Advanced (LTE-A) systems. The NR 5G or LTE network architecture 200 may be called an Evolved Packet System (EPS) 200 or some other appropriate terms. The EPS 200 may include one or more UEs 201, a Next Generation-Radio Access Network (NG-RAN) 202, a 5G-Core Network/Evolved Packet Core (5G-CN/EPC) 210, a Home Subscriber Server (HSS) 220 and an Internet service 230. The EPS may be interconnected with other access networks. For simple description, the entities/interfaces are not shown. As shown in FIG. 2, the EPS provides packet switching services. Those skilled in the art are easy to understand that various concepts presented throughout the disclosure can be extended to networks providing circuit switching services or other cellular networks. The NG-RAN includes an NR node B (gNB) 203 and other gNBs 204. The gNB 203 provides UE 201 oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Basic Service Set (BSS), an Extended Service Set (ESS), a TRP or some other appropriate terms. The gNB 203 provides an access point of the 5G-CN/EPC 210 for the UE 201. Examples of UE 201 include cellular phones, smart phones, Session Initiation Protocol (SIP) phones, laptop computers, Personal Digital Assistants (PDAs), satellite radios, non-territorial base station communications, satellite mobile communications, Global Positioning Systems (GPSs), multimedia devices, video devices, digital audio player (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art may also call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5G-CN/EPC 210 via an S1/NG interface. The 5G-CN/EPC 210 includes a Mobility Management Entity/Authentication Management Field/User Plane Function (MME/AMF/UPF) 211, other MMEs/AMFs/UPFs 214, a Service Gateway (S-GW) 212 and a Packet Data Network Gateway (P-GW) 213. The MME/AMF/UPF 211 is a control node for processing a signaling between the UE 201 and the 5G-CN/EPC 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet service 230. The Internet service 230 includes IP services corresponding to operators, specifically including internet, intranet, IP Multimedia Subsystems (IP IMSs) and PS Streaming Services (PSSs).

In one subembodiment, the UE 201 corresponds to the UE in the disclosure.

In one subembodiment, the gNB 203 corresponds to the base station in the disclosure.

In one subembodiment, the UE 201 is a terminal which supports performing wireless communications on unlicensed spectrum.

In one subembodiment, the gNB 203 supports performing wireless communications on unlicensed spectrum.

Embodiment 3

Figure 3:
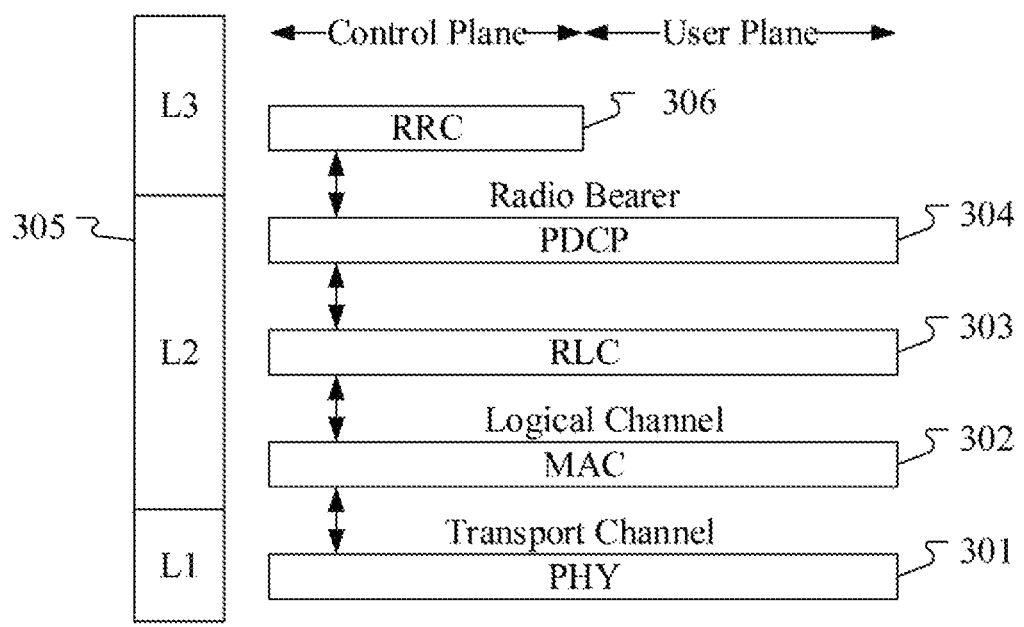
FIG. 3 is a diagram illustrating an embodiment of a radio protocol architecture of a user plane and a control plane according to one embodiment of the disclosure.

Embodiment 3 illustrates a diagram of an embodiment of a radio protocol architecture of a user plane and a control plane according to the disclosure, as shown in FIG. 3.

FIG. 3 is a diagram illustrating an embodiment of a radio protocol architecture of a user plane and a control plane. In FIG. 3, the radio protocol architecture of a UE and a gNB is represented by three layers, which are a Layer 1, a Layer 2 and a Layer 3 respectively. The Layer 1 (L1 layer) 301 is the lowest layer and implements various PHY (physical layer) signal processing functions. The L1 layer will be referred to herein as the PHY 301. The Layer 2 (L2 layer) 305 is above the PHY 301, and is responsible for the link between the UE and the gNB over the PHY 301. In the user plane, the L2 layer 305 includes a Medium Access Control (MAC) sublayer 302, a Radio Link Control (RLC) sublayer 303, and a Packet Data Convergence Protocol (PDCP) sublayer 304, which are terminated at the gNB on the network side. Although not shown in FIG. 3, the UE may include several higher layers above the L2 layer 305, including a network layer (i.e. IP layer) terminated at the P-GW on the network side and an application layer terminated at the other end (i.e. a peer UE, a server, etc.) of the connection. The PDCP sublayer 304 provides multiplexing between different radio bearers and logical channels. The PDCP sublayer 304 also provides header compression for higher-layer packets so as to reduce radio transmission overheads. The PDCP sublayer 304 provides security by encrypting packets and provides support for UE handover between gNBs. The RLC sublayer 303 provides segmentation and reassembling of higher-layer packets, retransmission of lost packets, and reordering of lost packets to as to compensate for out-of-order reception due to HARQ. The MAC sublayer 302 provides multiplexing between logical channels and transport channels. The MAC sublayer 302 is also responsible for allocating various radio resources (i.e., resource blocks) in one cell among UEs. The MAC sublayer 302 is also in charge of HARQ operations. In the control plane, the radio protocol architecture of the UE and the gNB is almost the same as the radio protocol architecture in the user plane on the PHY 301 and the L2 layer 305, with the exception that there is no header compression function for the control plane. The control plane also includes a Radio Resource Control (RRC) sublayer 306 in the layer 3 (L3). The RRC sublayer 306 is responsible for acquiring radio resources (i.e. radio bearers) and configuring lower layers using an RRC signaling between the gNB and the UE.

In one subembodiment, the radio protocol architecture shown in FIG. 3 is applicable to the UE in the disclosure.

In one subembodiment, the radio protocol architecture shown in FIG. 3 is applicable to the base station in the disclosure.

In one subembodiment, the first sequence in the disclosure is generated by the PHY 301.

In one subembodiment, the first signaling in the disclosure is generated by the PHY 301.

In one subembodiment, the first radio signal in the disclosure is generated by the PHY 301.

In one subembodiment, the first radio signal in the disclosure is generated by the MAC sublayer 302.

In one subembodiment, the second signaling in the disclosure is generated by the RRC sublayer 306.

In one subembodiment, the third signaling in the disclosure is generated by the RRC sublayer 306.

Embodiment 4

Figure 4:
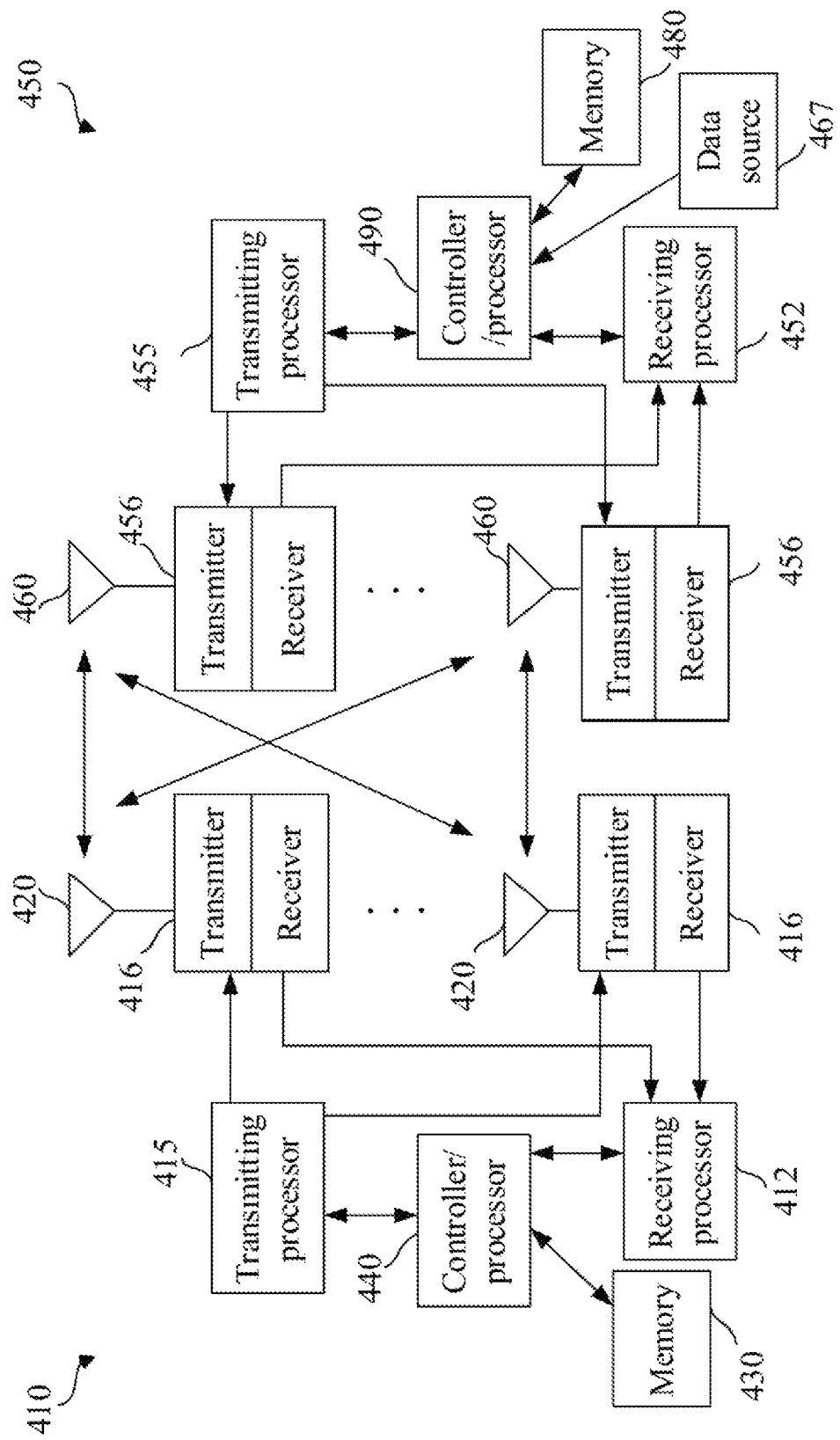
FIG. 4 is a diagram illustrating an evolved node B and a UE according to one embodiment of the disclosure.

Embodiment 4 illustrates a diagram of a base station and a UE according to the disclosure, as shown in FIG. 4. FIG. 4 is a block diagram of a gNB 410 in communication with a UE 450 in an access network.

The base station device 410 includes a controller/processor 440, a memory 430, a receiving processor 412, a transmitting processor 415, a transmitter/receiver 416 and an antenna 420.

The UE 450 includes a controller/processor 490, a memory 480, a data source 467, a transmitting processor 455, a receiving processor 452, a transmitter/receiver 456 and an antenna 460.

In uplink transmission, processes relevant to the base station device 410 include the following.

The receiver 416 receives a radio-frequency signal through the corresponding antenna 420, converts the received radio-frequency signal into a baseband signal, and provides the baseband signal to the receiving processor 412.

The receiver 416 receives a radio-frequency signal through the corresponding antenna 420, converts the received radio-frequency signal into a baseband signal, determines through an energy detection whether a given frequency band is available for transmission, and sends the result to the controller/processor 440.

The receiving processor 412 performs various signal receiving processing functions of L1 layer (that is, PHY), such as decoding, de-interleaving, descrambling, demodulation, extraction of physical layer control signalings, etc.

The controller/processor 440 performs functions of L2 layer, and is connected to the memory 430 that stores program codes and data.

The controller/processor 440 provides multiplexing between a transport channel and a logical channel, packet reassembling, decryption, header decompression, and control signal processing so as to recover a higher-layer packet coming from the UE 450. The higher-layer packet from the controller/processor 440 may be provided to a core network.

The controller/processor 440 determines according to an output of the receiver 416 whether scheduling signalings can be transmitted on a given frequency band.

In UL transmission, processes relevant to the UE 450 include the following.

The data source 467 provides a higher-layer packet to the controller/processor 490. The data source 467 illustrates all protocol layers above L2 layer.

The transmitter 456 transmits a radio-frequency signal through the corresponding antenna 460, converts a baseband signal into a radio-frequency signal and provides the radio-frequency signal to the corresponding antenna 460.

The receiver 456 receives a radio-frequency signal through the corresponding antenna 460, converts the received radio-frequency signal into a baseband signal, determines through an energy detection whether a given frequency band is available for transmission, and sends the result to the controller/processor 490.

The transmitting processor 455 performs various signal transmitting processing functions of L1 layer (that is, PHY), including encoding, interleaving, scrambling, modulation, generation of physical layer signalings, etc.

The transmitting processor 455 performs various signal transmitting processing functions of L1 layer (that is, PHY), including multi-antenna transmitting, spreading, code division multiplexing, precoding, etc.

The controller/processor 490 performs header compression, encryption, packet segmentation and reordering, and multiplexing between a logical channel and a transport channel based on the radio resource allocation of the gNB 410, and performs functions of Layer 2 used for the user plane and the control plane.

The controller/processor 490 is also in charge of HARQ operation, retransmission of lost packets, and signalings to the eNB 410.

The controller/processor 490 determines according to an output of the receiver 456 whether uplink data can be transmitted on a given frequency band.

In Downlink (DL) transmission, processes relevant to the base station device 410 include the following.

A higher-layer packet is provided to the controller/processor 440. The controller/processor 440 provides header compression, encryption, packet segmentation and reordering, multiplexing and de-multiplexing between a logical channel and a transport channel, to implement L2 protocols used for the user plane and the control plane. The higher-layer packet may include data or control information, for example, Downlink Shared Channel (DL-SCH).

The controller/processor 440 is connected to a memory 430 that stores program codes and data. The memory 430 may be a computer readable medium.

The controller/processor 440 includes a scheduling unit used for transmission requirements. The scheduling unit is configured to schedule air interface resources corresponding to transmission requirements.

The controller/processor 440 determines to transmit first control information, and sends the result to the transmitting processor 415.

The transmitting processor 415 receives a bit stream output from the controller/processor 440, and performs various signal transmitting processing functions of L1 layer (that is, PHY), including encoding, interleaving, scrambling, modulation, power control/allocation, generation of physical layer control signalings (including PBCH, PDCCH, PHICH, PCFICH, reference signal), etc.

The transmitter 416 is configured to convert the baseband signal provided by the transmitting processor 415 into a radio-frequency signal and transmit the radio-frequency signal via the antenna 420. Each transmitter 416 performs sampling processing on respective input symbol streams to obtain respective sampled signal streams. Each transmitter 416 performs further processing (for example, digital-to-analogue conversion, amplification, filtering, up conversion, etc.) on respective sampled streams to obtain a downlink signal.

The receiver 416 receives a radio-frequency signal through the corresponding antenna 420, converts the received radio-frequency signal into a baseband signal, determines through an energy detection whether a given frequency band is available for transmission, and sends the result to the controller/processor 440.

The controller/processor 440 determines according to an output of the receiver 416 whether scheduling signalings can be transmitted on a given frequency band.

In DL transmission, processes relevant to the UE 450 include the following.

The receiver 456 is configured to convert a radio-frequency signal received via the antenna 460 into a baseband signal and provide the baseband signal to the receiving processor 452.

The receiving processor 452 performs various signal receiving processing functions of L1 layer (that is, PHY), including decoding, de-interleaving, descrambling, demodulation, extraction of physical layer control signalings, etc.

The controller/processor 490 receives a bit stream output from the receiving processor 452, and provides header decompression, decryption, packet segmentation and reordering, multiplexing and de-multiplexing between a logical channel and a transport channel, to implement L2 protocols used for the user plane and the control plane.

The controller/processor 490 determines to receive first control information, and sends the result to the receiving processor 452.

The controller/processor 490 is connected to the memory 480 that stores program codes and data. The memory 480 may be a computer readable medium.

In one subembodiment, the UE 450 device includes at least one processor and at least one memory. The at least one memory includes computer program codes. The at least one memory and the computer program codes are configured to be used in collaboration with the at least one processor. The UE 450 device at least monitors a first sequence in a first time window, and, if the first sequence is detected in the first time window, performs a blind detection of a first signaling on K1 alternative Resource Element (RE) set(s); wherein the first signaling occupies one of the K1 alternative RE set(s) in time-frequency domain, any one of the K1 alternative RE set(s) includes a positive integer number of RE(s), each RE included in the any one of the K1 alternative RE set(s) belongs to an alternative time-frequency resource pool, the alternative time-frequency resource pool belongs to a second time window in time domain, the first sequence is used for determining a start time of the alternative time-frequency resource pool in the second time window, and a time domain position of the first time window is related to a time domain position of the second time window; the first signaling is a physical layer signaling; and the K1 is a positive integer.

In one subembodiment, the UE 450 includes a memory that stores a computer readable instruction program. The computer readable instruction program generates an action when executed by at least one processor. The action includes: monitoring a first sequence in a first time window; and, if the first sequence is detected in the first time window, performing a blind detection of a first signaling on K1 alternative Resource Element (RE) set(s); wherein the first signaling occupies one of the K1 alternative RE set(s) in time-frequency domain, any one of the K1 alternative RE set(s) includes a positive integer number of RE(s), each RE included in the any one of the K1 alternative RE set(s) belongs to an alternative time-frequency resource pool, the alternative time-frequency resource pool belongs to a second time window in time domain, the first sequence is used for determining a start time of the alternative time-frequency resource pool in the second time window, and a time domain position of the first time window is related to a time domain position of the second time window; the first signaling is a physical layer signaling; and the K1 is a positive integer.

In one subembodiment, the gNB 410 device includes at least one processor and at least one memory. The at least one memory includes computer program codes. The at least one memory and the computer program codes are configured to be used in collaboration with the at least one processor. The gNB 410 device at least transmits a first sequence in a first time window, and transmits a first signaling on one of K1 alternative RE set(s); wherein any one of the K1 alternative RE set(s) includes a positive integer number of RE(s), each RE included in the any one of the K1 alternative RE set(s) belongs to an alternative time-frequency resource pool, the alternative time-frequency resource pool belongs to a second time window in time domain, the first sequence is used for determining a start time of the alternative time-frequency resource pool in the second time window, and a time domain position of the first time window is related to a time domain position of the second time window; the first signaling is a physical layer signaling; and the K1 is a positive integer.

In one subembodiment, the gNB 410 includes a memory that stores a computer readable instruction program. The computer readable instruction program generates an action when executed by at least one processor. The action includes: transmitting a first sequence in a first time window, and transmitting a first signaling on one of K1 alternative RE set(s); wherein any one of the K1 alternative RE set(s) includes a positive integer number of RE(s), each RE included in the any one of the K1 alternative RE set(s) belongs to an alternative time-frequency resource pool, the alternative time-frequency resource pool belongs to a second time window in time domain, the first sequence is used for determining a start time of the alternative time-frequency resource pool in the second time window, and a time domain position of the first time window is related to a time domain position of the second time window; the first signaling is a physical layer signaling; and the K1 is a positive integer.

In one subembodiment, the UE 450 corresponds to the UE in the disclosure.

In one subembodiment, the gNB 410 corresponds to the base station in the disclosure.

In one subembodiment, at least the former two of the receiver 456, the receiving processor 452 and the controller/processor 490 are used for monitoring a first sequence in a first time window.

In one subembodiment, if the first sequence is detected in the first time window, at least the former two of the receiver 456, the receiving processor 452 and the controller/processor 490 are used for performing a blind detection of a first signaling on K1 alternative Resource Element (RE) set(s).

In one subembodiment, at least the former two of the receiver 456, the receiving processor 452 and the controller/processor 490 are used for receiving a first radio signal.

In one subembodiment, at least the former two of the transmitter 456, the transmitting processor 455 and the controller/processor 490 are used for transmitting a first radio signal.

In one subembodiment, at least the former two of the receiver 456, the receiving processor 452 and the controller/processor 490 are used for receiving a second signaling.

In one subembodiment, at least the former two of the receiver 456, the receiving processor 452 and the controller/processor 490 are used for receiving a third signaling.

In one subembodiment, at least the former two of the transmitter 416, the transmitting processor 415 and the controller/processor 440 are used for transmitting a first sequence in a first time window.

In one subembodiment, at least the former two of the transmitter 416, the transmitting processor 415 and the controller/processor 440 are used for transmitting a first signaling on one of K1 alternative RE set(s).

In one subembodiment, at least the former two of the transmitter 416, the transmitting processor 415 and the controller/processor 440 are used for transmitting a first radio signal.

In one subembodiment, at least the former two of the receiver 416, the receiving processor 412 and the controller/processor 440 are used for receiving a first radio signal.

In one subembodiment, at least the former two of the transmitter 416, the transmitting processor 415 and the controller/processor 440 are used for transmitting a second signaling.

In one subembodiment, at least the former two of the transmitter 416, the transmitting processor 415 and the controller/processor 440 are used for transmitting a third signaling.

In one subembodiment, at least the former two of the receiver 416, the receiving processor 412 and the controller/processor 440 are used for performing an energy detection of a first frequency band.

Embodiment 5

Figure 5:
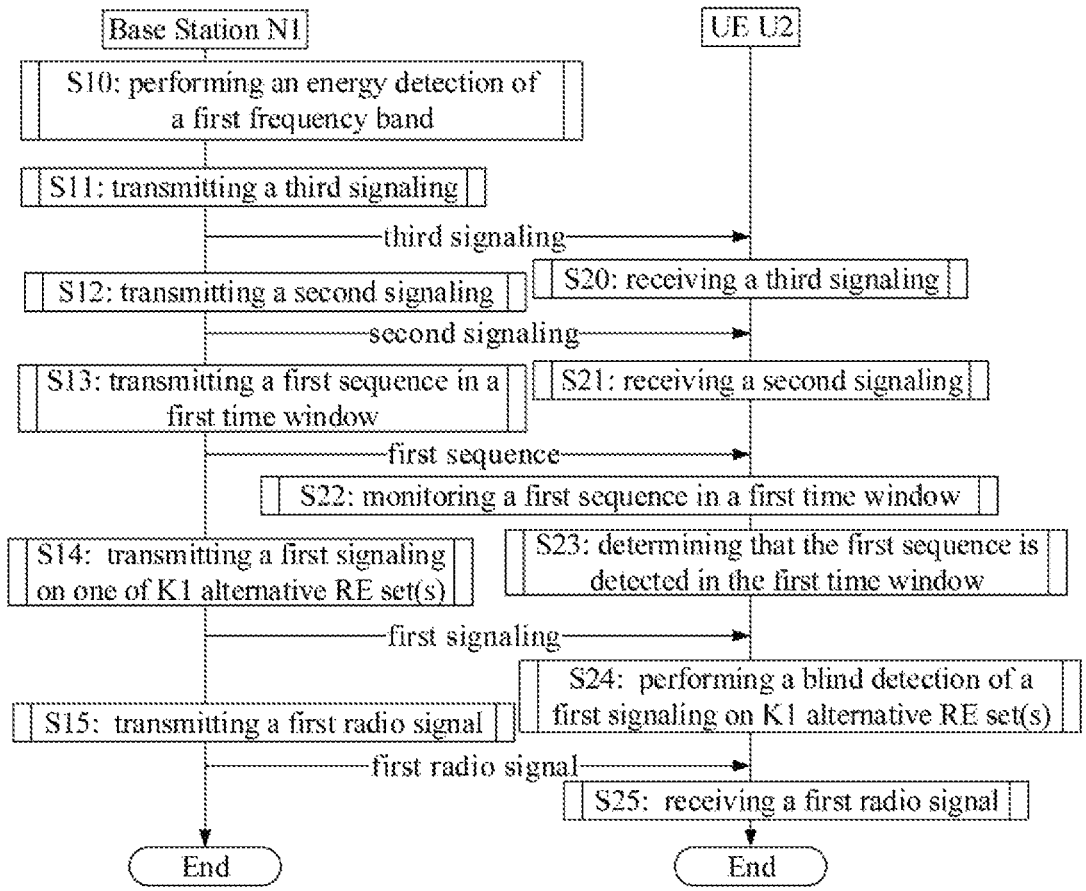
FIG. 5 is a flowchart of a first radio signal according to one embodiment of the disclosure.

Embodiment 5 illustrates an example of a flowchart of a first radio signal, as shown in FIG. 5. In FIG. 5, a base station N1 is a maintenance base station for a serving cell of a UE U2.

The base station N1 performs an energy detection of a first frequency band in S10, transmits a third signaling in S11, transmits a second signaling in S12, transmits a first sequence in a first time window in S13, transmits a first signaling on one of K1 alternative RE set(s) in S14, and transmits a first radio signal in S15.

The UE U2 receives a third signaling in S20, receives a second signaling in S21, monitors a first sequence in a first time window in S22, determines that the first sequence is detected in the first time window in S23, performs a blind detection of a first signaling on K1 alternative RE set(s) in S24, and receives a first radio signal in S25.

In one embodiment, the first signaling occupies one of the K1 alternative RE set(s) in time-frequency domain, any one of the K1 alternative RE set(s) includes a positive integer number of RE(s), each RE included in the any one of the K1 alternative RE set(s) belongs to an alternative time-frequency resource pool, the alternative time-frequency resource pool belongs to a second time window in time domain, the first sequence is used for determining a start time of the alternative time-frequency resource pool in the second time window, and a time domain position of the first time window is related to a time domain position of the second time window; the first signaling is a physical layer signaling; the K1 is a positive integer; the first signaling includes a first configuration information group for the first radio signal, and the first configuration information group includes at least one of positions of occupied time domain resources, positions of occupied frequency domain resources, or an MCS; the second signaling is used for determining a target time-frequency resource pool, the target time-frequency resource pool includes K2 target RE sets, any one of the K1 alternative RE set(s) is one of the K2 target RE sets; the K2 is a positive integer greater than the K1; the third signaling is used for determining L1 candidate time units, and the L1 candidate time units all belong to the first time window; time domain resources occupied by the first sequence belong to one of the L1 candidate time units; the UE U2 monitors the first sequence in the L1 candidate time units; the energy detection is used for determining that the first frequency band is unoccupied, and frequency domain resources occupied by the first signaling belong to the first frequency band.

In one embodiment, the first signaling is a downlink grant.

In one embodiment, the first signaling is Downlink Control Information (DCI).

In one embodiment, a physical channel corresponding to the first radio signal is a Physical Downlink Shared Channel (PDSCH).

In one embodiment, a transport channel corresponding to the first radio signal is a Downlink Shared Channel (DL-SCH).

In one embodiment, time domain resources occupied by the first radio signal belong to the first time window.

In one embodiment, whether time domain resources occupied by the first radio signal belong to the first time window is related to a start time of the second time window.

In one embodiment, the monitoring of the first sequence is a correlation detection.

In one embodiment, the UE detects out the first sequence through a correlation detection, and the UE performs a blind detection of a first signaling on K1 alternative RE set(s).

In one embodiment, the first sequence is one of W1 candidate sequences, and the UE performs a correlation detection of a radio signal generated by the first sequence using the W1 candidate sequences respectively.

In one embodiment, the monitoring of the first sequence is an energy detection.

In one embodiment, the monitoring of the first sequence is an energy detection; the phrase that the monitoring of the first sequence is an energy detection refers that: the UE detects an average power on an RE set occupied by the first sequence, and the RE set occupied by the first sequence includes a positive integer number of REs.

In one subembodiment, the average power is greater than a first threshold, and the UE performs a blind detection of the first signaling on the K1 alternative RE set(s).

In one subembodiment, long-term sharing of the first frequency band by other technologies is ensured to be absent, and the first signaling is transmitted in the first frequency band.

In one affiliated embodiment of the above subembodiment, the phrase that long-term sharing of the first frequency band by other technologies is ensured to be absent refers that: the first frequency band does not involve the transmission of radio access technologies based on non-3GPP protocols in a long time window.

In one embodiment, the K2 target RE sets occupy M2 multicarrier symbols in the first time window in time domain, the M2 multicarrier symbols include at least two given multicarrier symbols, which are adjacent in time domain and are inconsecutive in time domain.

In one embodiment, the K1 alternative RE set(s) occupy (occupies) M1 multicarrier symbols in the first time window in time domain, the M1 multicarrier symbols include at least two candidate multicarrier symbols, which are adjacent in time domain and are inconsecutive in time domain.

In one embodiment, the K1 alternative RE set(s) occupy (occupies) M1 multicarrier symbols in the first time window in time domain, and the M1 multicarrier symbols are consecutive in time domain.

In one embodiment, any one of the K2 target RE sets includes Q2 CCE(s), the Q2 being a positive integer.

In one subembodiment, the Q2 is equal to one of 1, 2, 4, 8, or 16.

In one embodiment, any one of the K2 target RE sets is one PDCCH candidate corresponding to one time of blind detection of the first signaling.

In one embodiment, any one of the K2 target RE sets is a CCE.

In one embodiment, any one of the K2 target RE sets has a time domain position in the first time window unrelated to a time domain position of the second time window.

In one embodiment, any one of the K2 target RE sets has a frequency domain position in the first time window unrelated to a time domain position of the second time window.

In one embodiment, a maximum number of blind detections of the first signaling performed by the UE U2 in the first time window is equal to X1; and the X1 is a positive integer less than the K2 but not greater than the K1.

In one subembodiment, the X1 is equal to one of 44, 36, 22 or 20.

In one subembodiment, the X1 is related to a subcarrier spacing employed by the first signaling.

In one embodiment, the L1 candidate time units are L1 multicarrier symbols respectively.

In one embodiment, the L1 candidate time units are L1 candidate multicarrier symbol sets respectively, and any one of the L1 candidate multicarrier symbol sets includes a positive integer number of multicarrier symbols consecutive in time domain.

In one embodiment, the L1 candidate time units include at least two candidate time units, which are inconsecutive in time domain.

In one embodiment, the third signaling is an RRC signaling.

In one embodiment, the third signaling is cell specific.

In one embodiment, the third signaling is UE specific.

In one embodiment, the third signaling is further used for determining frequency domain resources occupied by the first sequence.

In one embodiment, the first sequence occupies a positive integer number of RE(s).

In one embodiment, a first identifier is used for determining the K1 alternative RE set(s) from the alternative time-frequency resource pool.

In one subembodiment, the first identifier is UE specific.

In one subembodiment, the first identifier is a Cell-RNTI (C-RNTI).

In one subembodiment, the first identifier is a System Information RNTI (SI-RNTI).

In one subembodiment, the first identifier is a Configured Scheduling RNTI (CI-RNTI).

In one subembodiment, the first identifier is a Slot Format Indicator RNTI (SFI-RNTI).

In one subembodiment, the first identifier is a Semi-Persistent Channel State Information RNTI (SP-CSI-RNTI).

In one subembodiment, the phrase that a first identifier is used for determining the K1 alternative RE set(s) from the alternative time-frequency resource pool refers that: the first sequence is used by the UE to determine a start time of the alternative time-frequency resource pool in the second time window, then positions of REs occupied by any one of the K1 alternative RE sets are determined in the alternative time-frequency resource pool according to the first identifier.

In one subembodiment, the phrase that a first identifier is used for determining the K1 alternative RE set(s) from the alternative time-frequency resource pool refers that: the UE determines positions of REs occupied by any one of the K2 target RE sets from the first time window according to the first identifier, and then determines a start time of the alternative time-frequency resource pool through the first sequence; the K2 target RE sets include K1 target RE sets, REs occupied by any one of the K1 target RE sets all belong to the alternative time-frequency resource pool, and the K1 target RE sets are the K1 alternative RE sets respectively.

In one embodiment, the base station N1 performs an energy detection of the first frequency band in a third time window, the third time window is located before time domain resources occupied by the first sequence in time domain, and the third time window is continuous with the time domain resources occupied by the first sequence.

In one subembodiment, the first frequency band belongs to unlicensed spectrum.

In one embodiment, the energy detection is implemented through an energy detection method in WiFi.

In one embodiment, the energy detection is implemented through a measurement of Received Signal Strength Indication (RSSI).

In one embodiment, the phrase that the base station N1 performs an energy detection of a first frequency band refers that: the base station N1 performs Q times of energy detections in Q time subpools of the first frequency band, the Q being a positive integer greater than 1; the Q time subpools belong to the third time window.

In one subembodiment, one time of energy detection refers that: the base station N1 monitors a received power in a given time unit, and the given time unit belongs to one of the Q time subpools.

In one subembodiment, one time of energy detection refers that: the base station N1 monitors a received energy in a given time unit, and the given time unit belongs to one of the Q time subpools.

In one subembodiment, one time of energy detection refers that: the base station N1 senses all radio signals on a given frequency domain resource in a given time unit to obtain a given power; the given frequency domain resource is the first frequency band; and the given time unit belongs to one of the Q time subpools.

In one subembodiment, one time of energy detection refers that: the base station N1 senses all radio signals on a given frequency domain resource in a given time unit to obtain a given energy; the given frequency domain resource is the first frequency band; and the given time unit belongs to one of the Q time subpools.

In one subembodiment, the energy detection is implemented through an approach defined in Chapter 15 in 3GPP TS 36.213.

In one subembodiment, the energy detection is implemented through an energy detection method in LTE LAA.

In one subembodiment, the energy detection is an energy detection in LBT.

In one subembodiment, the energy detection is an energy detection in Clear Channel Assessment (CCA).

In one subembodiment, the Q times of energy detections all correspond to a detection unit of dBm.

In one subembodiment, the Q times of energy detections all correspond to a detection unit of milliwatt.

In one subembodiment, the Q times of energy detections all correspond to a detection unit of Joule.

In one subembodiment, any two of the Q time subpools have an equal duration of time.

In one subembodiment, two of the Q time subpools have different durations of time.

In one embodiment, one of the Q time subpools has a duration of 16 microseconds.

In one subembodiment, the earliest time subpool among the Q time subpools has a different duration of time from the other time subpools.

In one subembodiment, any two of the Q time subpools are orthogonal in time.

In one subembodiment, the Q time subpools occupy consecutive time domain resources.

In one subembodiment, any two of the Q time subpools occupy inconsecutive time domain resources.

In one subembodiment, any one of the Q time subpools occupies consecutive time domain resources.

In one subembodiment, the Q time subpools are the listening time in Category 4 LBT.

In one subembodiment, the Q time subpools include a defer slot and a back-off slot in Category 4 LBT.

In one subembodiment, the phrase that the energy detection is used for determining that the first frequency band is unoccupied refers that: each of the Q times of energy detections detects an energy less than a second threshold, and the base station N1 determines to transmit the first sequence.

In one affiliated embodiment of the above subembodiment, the second threshold is fixed, or the second threshold is configured through a higher layer signaling.

Embodiment 6

Figure 6:
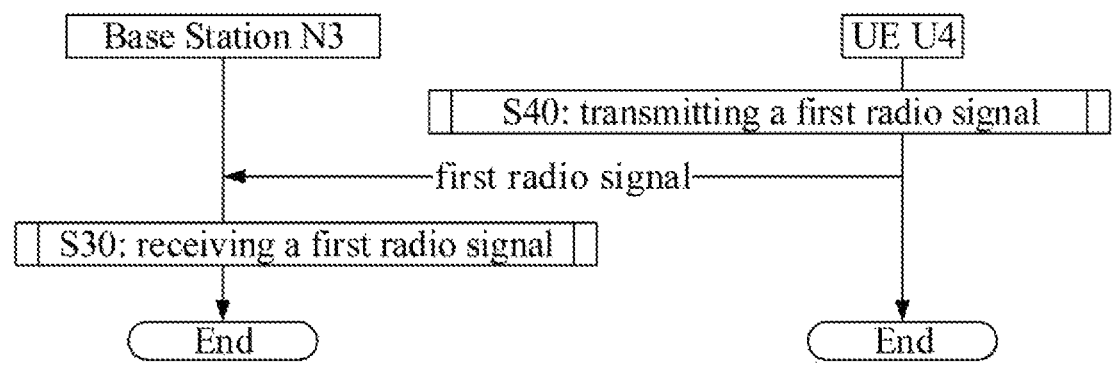
FIG. 6 is a flowchart of a first radio signal according to another embodiment of the disclosure.

Embodiment 6 illustrates an example of another flowchart of a first radio signal, as shown in FIG. 6. In FIG. 6, a base station N3 is a maintenance base station for a serving cell of a UE U4.

The base station N3 receives a first radio signal in S30.

The UE U4 transmits a first radio signal in S40.

In Embodiment 6, a first signaling includes a first configuration information group for the first radio signal, and the first configuration information group includes at least one of positions of occupied time domain resources, positions of occupied frequency domain resources, or an MCS.

In one embodiment, S30 in Embodiment 6 can replace S15 in Embodiment 5, and S40 in Embodiment 6 can replace S25 in Embodiment 5.

In one Embodiment, the first signaling is an uplink grant.

In one embodiment, the first signaling is a DCI.

In one embodiment, a physical channel corresponding to the first radio signal is a PUSCH.

In one embodiment, a transport channel corresponding to the first radio signal is a UL-SCH.

In one embodiment, time domain resources occupied by the first radio signal belong to the first time window in the disclosure.

In one embodiment, whether time domain resources occupied by the first radio signal belong to the first time window in the disclosure is related to a start time of the second time window in the disclosure.

Embodiment 7

Figure 7:
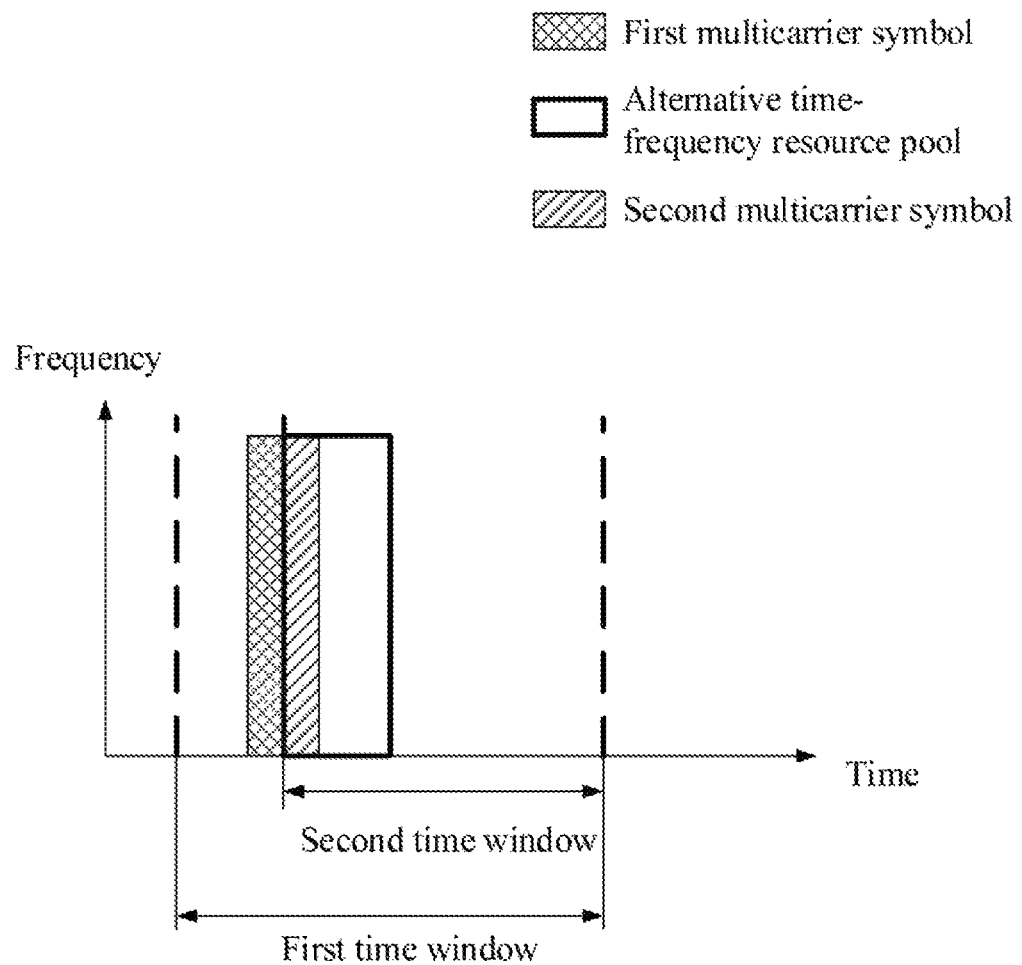
FIG. 7 is a diagram illustrating a first time window and a second time window according to one embodiment of the disclosure.

Embodiment 7 illustrates an example of a diagram of a first time window and a second time window according to one embodiment, as shown in FIG. 7. In FIG. 7, time domain resources occupied by the first time window overlap with time domain resources occupied by the second time window; time domain resources occupied by the alternative time-frequency resource pool in the disclosure belong to the second time window; the UE in the disclosure detects the first sequence in a first multicarrier symbol, and the UE determines that a start time of the alternative time-frequency resource pool in time domain is a second multicarrier symbol.

In one embodiment, the phrase that time domain resources occupied by the first time window overlap with time domain resources occupied by the second time window refers that: at least one multicarrier symbol occupies time domain resources which belong to both the first time window and the second time window.

In one embodiment, a start time of the second time window in time domain changes with a time domain position of the first multicarrier symbol.

In one embodiment, the second time window starts from the very first multicarrier symbol behind the first multicarrier symbol in time domain.

In one embodiment, the alternative time-frequency resource pool belongs to the target time-frequency resource pool in the disclosure, and the alternative time-frequency resource pool belongs to time-frequency resources in the target time-frequency resource pool which overlap with the second time window.

Embodiment 8

Figure 8:
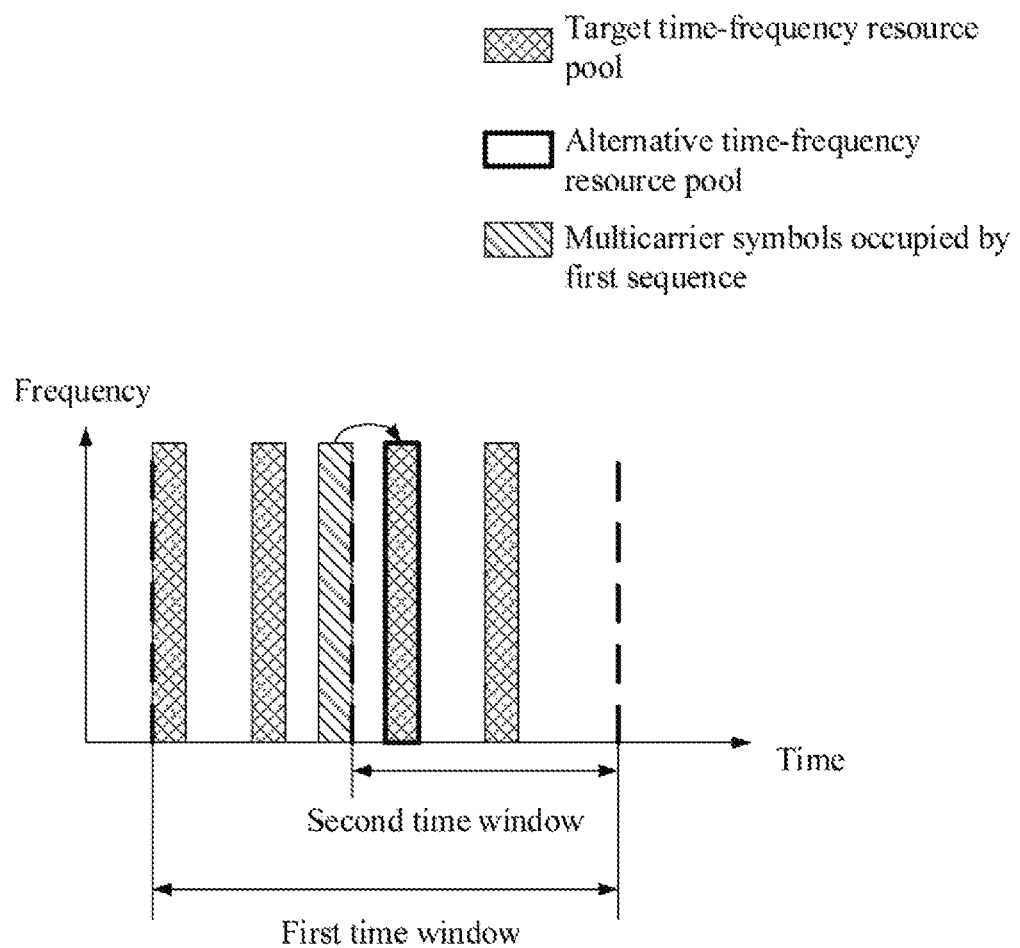
FIG. 8 is a diagram illustrating a target time-frequency resource pool according to one embodiment of the disclosure.

Embodiment 8 illustrates an example of a diagram of a target time-frequency resource pool, as shown in FIG. 8. In FIG. 8, the target time-frequency resource pool occupies frequency domain resources corresponding to a positive integer number of RBs in frequency domain, and the target time-frequency resource pool occupies M2 multicarrier symbols in time domain; the alternative time-frequency resource pool shown in FIG. 8 occupies partial time-frequency resources in the target time-frequency resource pool; the arrow shown in FIG. 8 indicates that the first sequence is used for determining a start time of the alternative time-frequency resource pool in the second time window.

In one embodiment, the target time-frequency resource pool is configured through a higher layer signaling.

In one embodiment, the target time-frequency resource pool is UE specific.

In one embodiment, at least two of the M2 multicarrier symbols are inconsecutive in time domain.

In one embodiment, the target time-frequency resource pool is one CORESET.

In one embodiment, the target time-frequency resource pool includes a positive integer number of CORESETs.

In one embodiment, REs included in the alternative time-frequency resource pool belong to a given RE set, and the given RE set is an RE set composed of REs in the target time-frequency resource pool which are located in the second time window.

Embodiment 9

Figure 9:
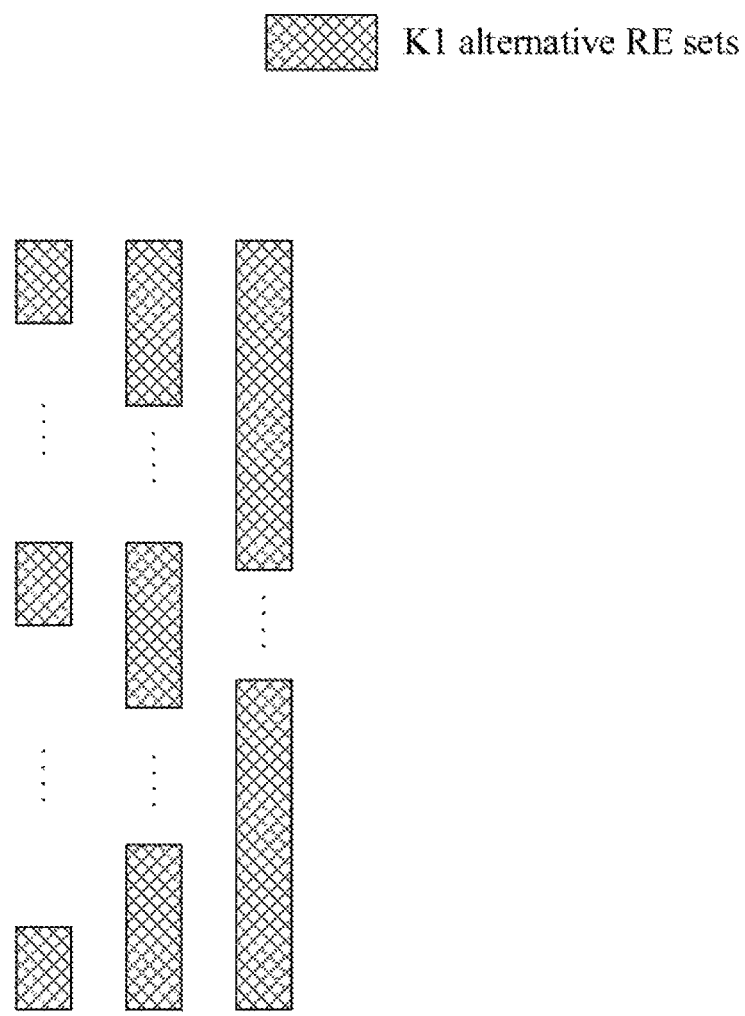
FIG. 9 is a diagram illustrating K1 alternative RE sets according to one embodiment of the disclosure.

Embodiment 9 illustrates an example of a diagram of K1 alternative RE sets, as shown in FIG. 9. In FIG. 9, any one of the K1 alternative RE sets includes a positive integer number of REs.

In one embodiment, the K1 alternative RE sets occupy M1 multicarrier symbols in time domain, and the M1 multicarrier symbols are consecutive in time domain.

In one embodiment, the K1 alternative RE sets include at least two alternative RE sets, which include at least one same RE.

In one embodiment, any one of the K1 alternative RE sets occupies subcarriers corresponding to at least one RB in frequency domain.

Embodiment 10

Figure 10:
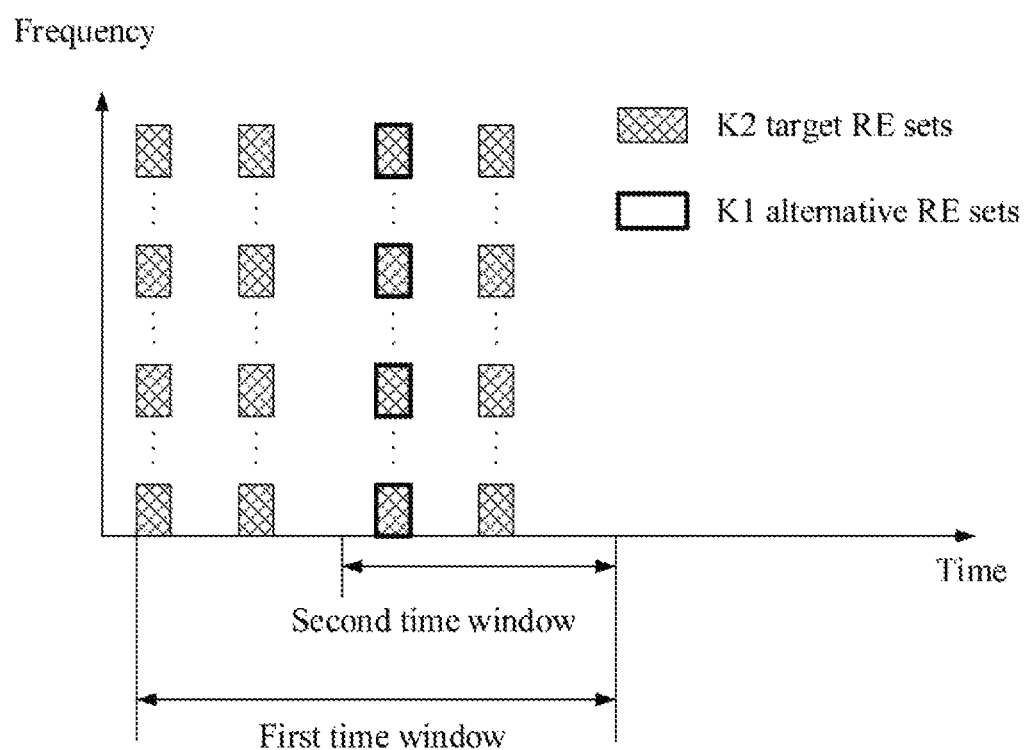
FIG. 10 is a diagram illustrating K2 target RE sets according to one embodiment of the disclosure.

Embodiment 10 illustrates an example of a diagram of K2 target RE sets, as shown in FIG. 10. In FIG. 10, any one of the K2 target RE sets includes a positive integer number of REs.

In one embodiment, the K1 alternative RE sets in the disclosure are a subset of the K2 target RE sets.

In one embodiment, a position of the K1 alternative RE sets in the disclosure in the K2 target RE sets is related to a time domain position where the first sequence is transmitted.

In one embodiment, the K1 alternative RE sets in the disclosure are located behind the first multicarrier symbol occupied by the first sequence in time domain.

Embodiment 11

Figure 11:
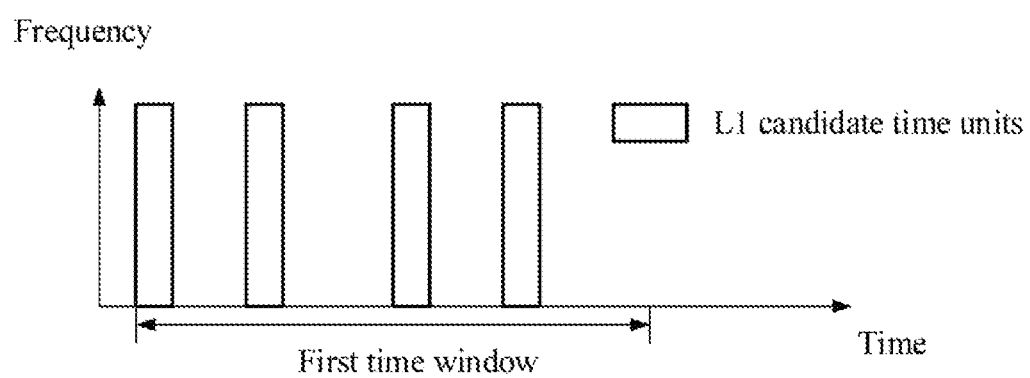
FIG. 11 is a diagram illustrating L1 candidate time units according to one embodiment of the disclosure.

Embodiment 11 illustrates an example of a diagram of L1 candidate time units, as shown in FIG. 11. In FIG. 11, the L1 candidate time units are distributed discretely in time domain.

In one embodiment, the L1 candidate time units correspond to L1 multicarrier symbols respectively, and the L1 multicarrier symbols are discrete in time domain.

In one embodiment, the L1 candidate time units all belong to the first time window.

In one embodiment, the L1 candidate time units are configured through a higher layer signaling.

In one embodiment, the L1 candidate time units include L1 first-type time-frequency resource sets respectively, the L1 first-type time-frequency resource sets all occupy the same given frequency domain resource, and the given frequency domain resource is configured through the third signaling in the disclosure.

Embodiment 12

Figure 12:
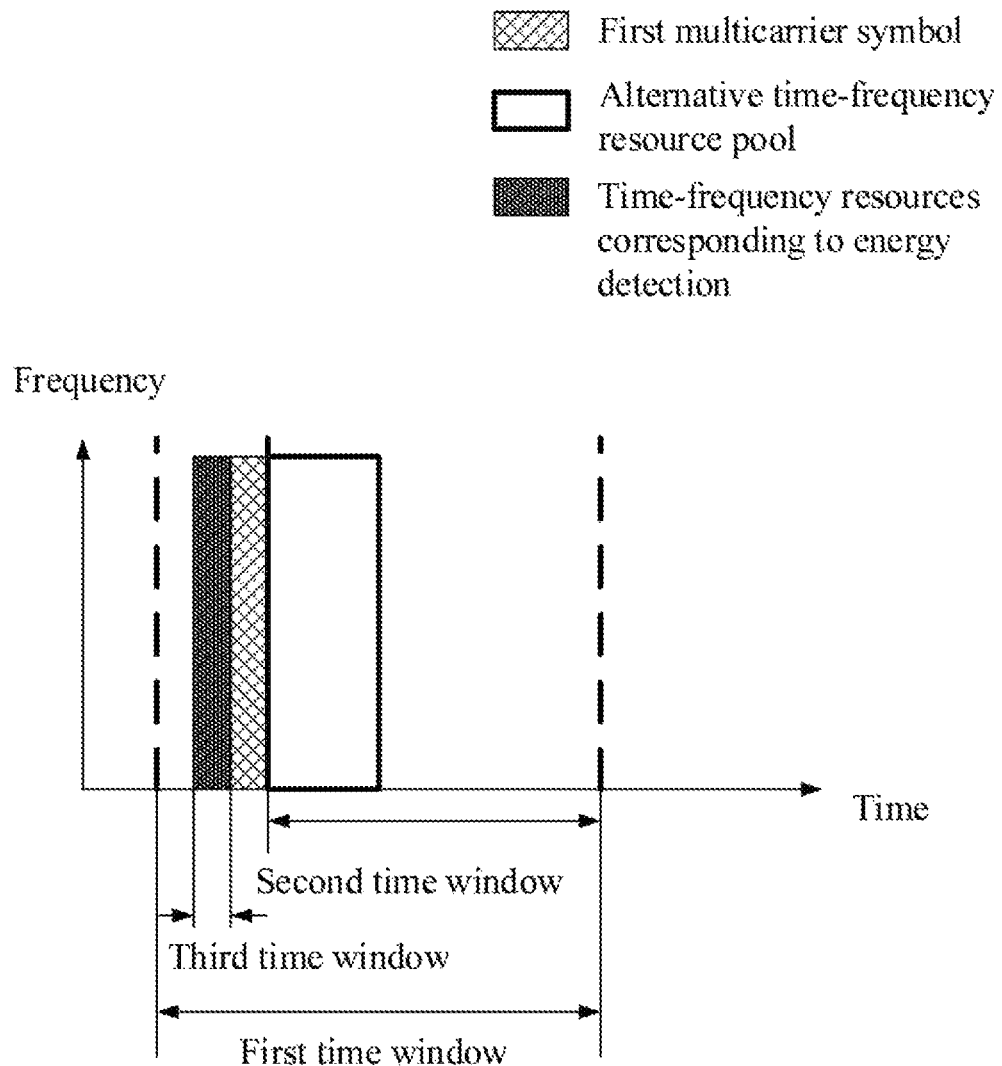
FIG. 12 is a diagram illustrating an energy detection according to the disclosure.

Embodiment 12 illustrates an example of a diagram of an energy detection. In FIG. 12, the base station in the disclosure performs an energy detection of a first frequency band in a third time window shown in FIG. 12, the energy detection is used for determining that the first frequency band is unoccupied, the base station transmits the first sequence in the first multicarrier symbol, and transmits the first signaling in the alternative time-frequency resource pool shown in FIG. 12.

In one subembodiment, the third time window includes the Q time subpools in the disclosure.

In one subembodiment, the base station selects a start time of the third time window in time domain autonomously.

Embodiment 13

Figure 13:
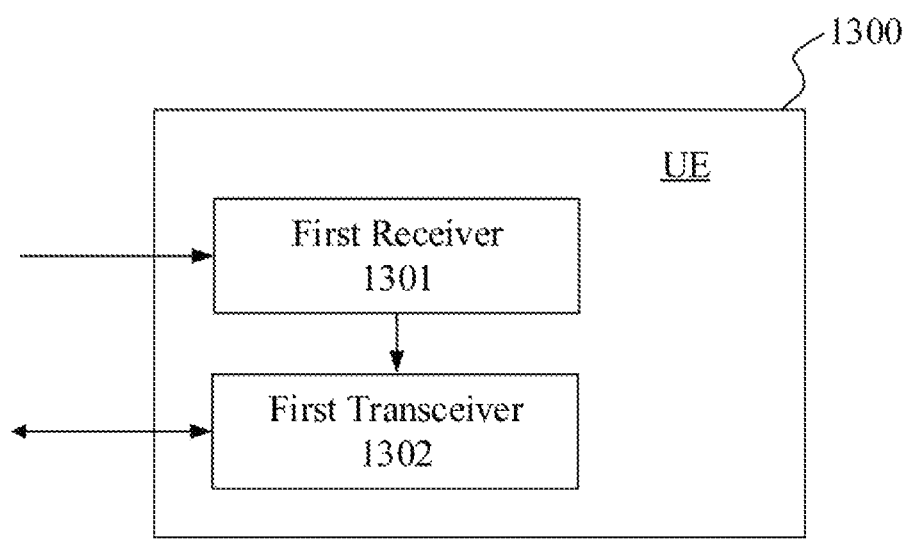
FIG. 13 is a structure block diagram illustrating a processing device in a UE according to one embodiment of the disclosure.

Embodiment 13 illustrates an example of a structure block diagram of a processing device in a UE, as shown in FIG. 13. In FIG. 13, the processing device 1300 in the UE includes a first receiver 1301 and a first transceiver 1302.

The first receiver 1301 monitors a first sequence in a first time window.

The first transceiver 1302, if the first sequence is detected in the first time window, performs a blind detection of a first signaling on K1 alternative RE set(s).

In Embodiment 13, the first signaling occupies one of the K1 alternative RE set(s) in time-frequency domain, any one of the K1 alternative RE set(s) includes a positive integer number of RE(s), each RE included in the any one of the K1 alternative RE set(s) belongs to an alternative time-frequency resource pool, the alternative time-frequency resource pool belongs to a second time window in time domain, the first sequence is used for determining a start time of the alternative time-frequency resource pool in the second time window, and a time domain position of the first time window is related to a time domain position of the second time window; the first signaling is a physical layer signaling; and the K1 is a positive integer.

In one embodiment, the first transceiver 1302 further operates a first radio signal; the operating is receiving, or the operating is transmitting; the first signaling includes a first configuration information group for the first radio signal, and the first configuration information group includes at least one of positions of occupied time domain resources, positions of occupied frequency domain resources, or an MCS.

In one embodiment, the monitoring of the first sequence is a correlation detection, or the monitoring of the first sequence is an energy detection.

In one embodiment, the first receiver 1301 further receives a second signaling; the second signaling is used for determining a target time-frequency resource pool, the target time-frequency resource pool includes K2 target RE sets, any one of the K1 alternative RE set(s) is one of the K2 target RE sets; and the K2 is a positive integer greater than the K1.

In one embodiment, a maximum number of blind detections of the first signaling performed by the UE in the first time window is equal to X1; and the X1 is a positive integer less than the K2 but not greater than the K1.

In one embodiment, the first receiver 1301 further receives a third signaling; the third signaling is used for determining L1 candidate time units, and the L1 candidate time units all belong to the first time window; time domain resources occupied by the first sequence belong to one of the L1 candidate time units; and the UE monitors the first sequence in the L1 candidate time units.

In one embodiment, a first identifier is used for determining the K1 alternative RE set(s) from the alternative time-frequency resource pool.

In one embodiment, the first transceiver further determines that the first sequence is detected in the first time window.

In one subembodiment, the first receiver 1301 includes at least the former two of the receiver 456, the receiving processor 452 and the controller/processor 490 mentioned in Embodiment 4.

In one subembodiment, the first transceiver 1302 includes at least the former four of the transmitter/receiver 456, the transmitting processor 455, the receiving processor 452 and the controller/processor 490 mentioned in Embodiment 4.

Embodiment 14

Figure 14:
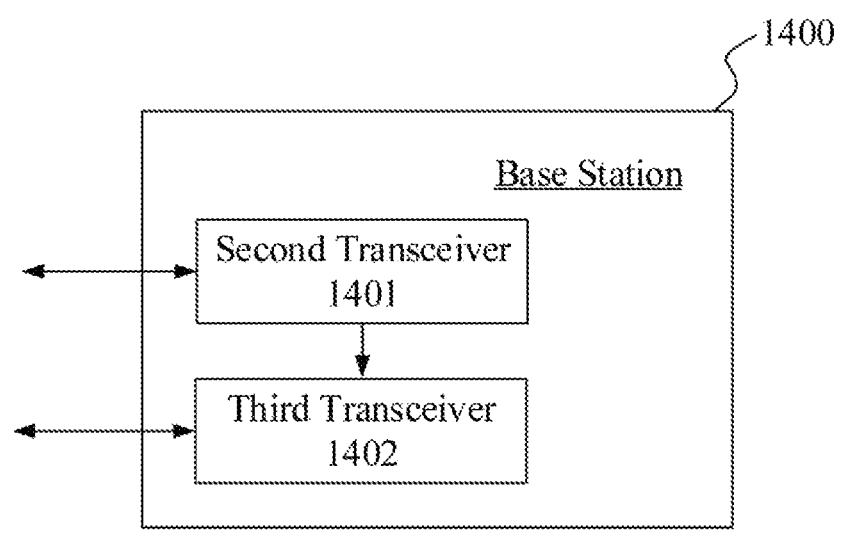
FIG. 14 is a structure block diagram illustrating a processing device in a base station according to one embodiment of the disclosure.

Embodiment 14 illustrates an example of a structure block diagram of a processing device in a base station, as shown in FIG. 14. In FIG. 14, the processing device 1400 in the base station includes a second transceiver 1401 and a third transceiver 1402.

The second transceiver 1401 transmits a first sequence in a first time window.

The third transceiver 1402 transmits a first signaling on one of K1 alternative RE set(s).

In Embodiment 14, any one of the K1 alternative RE set(s) includes a positive integer number of RE(s), each RE included in the any one of the K1 alternative RE set(s) belongs to an alternative time-frequency resource pool, the alternative time-frequency resource pool belongs to a second time window in time domain, the first sequence is used for determining a start time of the alternative time-frequency resource pool in the second time window, and a time domain position of the first time window is related to a time domain position of the second time window; the first signaling is a physical layer signaling; and the K1 is a positive integer.

In one embodiment, the third transceiver 1402 further processes a first radio signal; the processing is transmitting, or the processing is receiving; the first signaling includes a first configuration information group for the first radio signal, and the first configuration information group includes at least one of positions of occupied time domain resources, positions of occupied frequency domain resources, or an MCS.

In one embodiment, the monitoring of the first sequence is a correlation detection, or the monitoring of the first sequence is an energy detection.

In one embodiment, the second transceiver 1401 further transmits a second signaling; the second signaling is used for determining a target time-frequency resource pool, the target time-frequency resource pool includes K2 target RE sets, any one of the K1 alternative RE set(s) is one of the K2 target RE sets; and the K2 is a positive integer greater than the K1.

In one embodiment, a receiver of the first signaling includes a first terminal, and a maximum number of blind detections of the first signaling performed by the first terminal in the first time window is equal to X1; and the X1 is a positive integer less than the K2 but not greater than the K1.

In one embodiment, the second transceiver 1401 further transmits a third signaling; wherein the third signaling is used for determining L1 candidate time units, and the L1 candidate time units all belong to the first time window; time domain resources occupied by the first sequence belong to one of the L1 candidate time units; a receiver of the first signaling includes a first terminal, and the first terminal monitors the first sequence in the L1 candidate time units.

In one embodiment, a first identifier is used for determining the K1 alternative RE set(s) from the alternative time-frequency resource pool.

In one embodiment, the second transceiver 1401 further performs an energy detection of a first frequency band; the energy detection is used for determining that the first frequency band is unoccupied, and frequency domain resources occupied by the first signaling belong to the first frequency band.

In one subembodiment, the second transceiver 1401 includes at least the former four of the transmitter/receiver 416, the transmitting processor 415, the receiving processor 412 and the controller/processor 440 mentioned in Embodiment 4.

In one subembodiment, the third transceiver 1402 includes at least the former four of the transmitter/receiver 416, the transmitting processor 415, the receiving processor 412 and the controller/processor 440 mentioned in Embodiment 4.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The disclosure is not limited to any combination of hardware and software in specific forms. The UE and terminal in the disclosure include but not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things, REID terminals, NB-IOT terminals, Machine Type Communication (MTC) terminals, enhanced MTC (eMTC) terminals, data cards, low-cost mobile phones, low-cost tablet computers, and other radio communication equipment. The base station in the disclosure includes but not limited to macro-cellular base stations, micro-cellular base stations, home base stations, relay base station, gNB, TRP, and other radio communication equipment.

The above are merely the preferred embodiments of the disclosure and are not intended to limit the scope of protection of the disclosure. Any modification, equivalent substitute and improvement made within the spirit and principle of the disclosure are intended to be included within the scope of protection of the disclosure.

What is claimed is:

1. A method in a User Equipment (UE) for wireless communication, comprising:
receiving a second signaling;
monitoring a first sequence in a first time window; and
if the first sequence is detected in the first time window, performing a blind detection of a first signaling on K1 alternative Resource Element (RE) set(s);
wherein the first signaling occupies one of the K1 alternative RE set(s) in time-frequency domain, any one of the K1 alternative RE set(s) comprises a positive integer number of RE(s), each RE comprised in the any one of the K1 alternative RE set(s) belongs to an alternative time-frequency resource pool, the alternative time-frequency resource pool belongs to a second time window in time domain; the first sequence is detected by the UE in a first multicarrier symbol, and the start time of the alternative time-frequency resource pool is a second multicarrier symbol; the first multicarrier symbol belongs to the first time window, and the second multicarrier symbol belongs to the second time window; the second multicarrier symbol is one of P1 multicarrier symbols, the P1 being a positive integer greater than 1; the second multicarrier symbol is the multicarrier symbol among the P1 multicarrier symbols which is located behind the first multicarrier symbol and has a minimum interval in time domain to the first multicarrier symbol; and time domain positions of the P1 multicarrier symbols are determined through a higher layer signaling; a start time of the second time window in time domain is not earlier than an end time when the first sequence is detected in the first time window; the first signaling is a physical layer signaling; and the K1 is a positive integer; the second signaling is used for determining a target time-frequency resource pool, the target time-frequency resource pool comprises K2 target RE sets, any one of the K1 alternative RE set(s) is one of the K2 target RE sets; and the K2 is a positive integer greater than the K1; the target time-frequency resource pool is one CORESET; the alternative time-frequency resource pool includes partial of time domain resources occupied by the target time-frequency resource pool; the K1 alternative RE sets are a subset of the K2 target RE sets; any one of the K1 alternative RE set(s) is one PDCCH candidate corresponding to one time of blind detection of the first signaling.

2. The method according to claim 1, comprising:
operating a first radio signal;
wherein the operating is receiving, or the operating is transmitting; the first signaling comprises a first configuration information group for the first radio signal, and the first configuration information group comprises at least one of positions of occupied time domain resources, positions of occupied frequency domain resources, or a Modulation and Coding Scheme (MCS);
or, receiving a third signaling;
wherein the third signaling is used for determining L1 candidate time units, and the L1 candidate time units all belong to the first time window; time domain resources occupied by the first sequence belong to one of the L1 candidate time units; and the UE monitors the first sequence in the L1 candidate time units.

3. The method according to claim 1, wherein
a first identifier is used for determining the K1 alternative RE set(s) from the alternative time-frequency resource pool; the first identifier is a Cell-RNTI; the UE determines positions of REs occupied by any one of the K2 target RE sets from the first time window according to the first identifier, and then determines a start time of the alternative time-frequency resource pool through the first sequence; the K2 target RE sets include K1 target RE sets, REs occupied by any one of the K1 target RE sets all belong to the alternative time-frequency resource pool, and the K1 target RE sets are the K1 alternative RE sets respectively.

4. The method according to claim 1, wherein a maximum number of blind detections of the first signaling performed by the UE in the first time window is equal to X1; and the X1 is a positive integer less than the K2 but not greater than the K1.

5. A method in a base station for wireless communication, comprising:
transmitting a second signaling;
transmitting a first sequence in a first time window; and
transmitting a first signaling on one of K1 alternative RE set(s);
wherein any one of the K1 alternative RE set(s) comprises a positive integer number of RE(s), each RE comprised in the any one of the K1 alternative RE set(s) belongs to an alternative time-frequency resource pool, the alternative time-frequency resource pool belongs to a second time window in time domain; a receiver of the first sequence includes a UE; the first sequence is detected by the UE in a first multicarrier symbol, and the start time of the alternative time-frequency resource pool is a second multicarrier symbol; the first multicarrier symbol belongs to the first time window, and the second multicarrier symbol belongs to the second time window; the second multicarrier symbol is one of P1 multicarrier symbols, the P1 being a positive integer greater than 1; the second multicarrier symbol is the multicarrier symbol among the P1 multicarrier symbols which is located behind the first multicarrier symbol and has a minimum interval in time domain to the first multicarrier symbol; and time domain positions of the P1 multicarrier symbols are determined through a higher layer signaling; a start time of the second time window in time domain is not earlier than an end time when the first sequence is detected in the first time window; the first signaling is a physical layer signaling; and the K1 is a positive integer; the second signaling is used for determining a target time-frequency resource pool, the target time-frequency resource pool comprises K2 target RE sets, any one of the K1 alternative RE set(s) is one of the K2 target RE sets; and the K2 is a positive integer greater than the K1; the target time-frequency resource pool is one CORESET; the alternative time-frequency resource pool includes partial of time domain resources occupied by the target time-frequency resource pool; the K1 alternative RE sets are a subset of the K2 target RE sets; any one of the K1 alternative RE set(s) is one PDCCH candidate corresponding to one time of blind detection of the first signaling.

6. The method according to claim 5, comprising:
processing a first radio signal;
wherein the processing is transmitting, or the processing is receiving; the first signaling comprises a first configuration information group for the first radio signal, and the first configuration information group comprises at least one of positions of occupied time domain resources, positions of occupied frequency domain resources, or an MCS;
or, transmitting a third signaling;
wherein the third signaling is used for determining L1 candidate time units, and the L1 candidate time units all belong to the first time window; time domain resources occupied by the first sequence belong to one of the L1 candidate time units; a receiver of the first signaling comprises a first terminal, and the first terminal monitors the first sequence in the L1 candidate time units.

7. The method according to claim 5, wherein
a first identifier is used for determining the K1 alternative RE set(s) from the alternative time-frequency resource pool; the first identifier is a Cell-RNTI; the UE determines positions of REs occupied by any one of the K2 target RE sets from the first time window according to the first identifier, and then determines a start time of the alternative time-frequency resource pool through the first sequence; the K2 target RE sets include K1 target RE sets, REs occupied by any one of the K1 target RE sets all belong to the alternative time-frequency resource pool, and the K1 target RE sets are the K1 alternative RE sets respectively.

8. The method according to claim 5, comprising:
performing an energy detection of a first frequency band;
wherein the energy detection is used for determining that the first frequency band is unoccupied, and frequency domain resources occupied by the first signaling belong to the first frequency band.

9. A UE for wireless communication, comprising:
a first receiver, to receive a second signaling; to monitor a first sequence in a first time window; and
a first transceiver, if the first sequence is detected in the first time window, to perform a blind detection of a first signaling on K1 alternative RE set(s);
wherein the first signaling occupies one of the K1 alternative RE set(s) in time-frequency domain, any one of the K1 alternative RE set(s) comprises a positive integer number of RE(s), each RE comprised in the any one of the K1 alternative RE set(s) belongs to an alternative time-frequency resource pool, the alternative time-frequency resource pool belongs to a second time window in time domain; the first sequence is detected by the UE in a first multicarrier symbol, and the start time of the alternative time-frequency resource pool is a second multicarrier symbol; the first multicarrier symbol belongs to the first time window, and the second multicarrier symbol belongs to the second time window; the second multicarrier symbol is one of P1 multicarrier symbols, the P1 being a positive integer greater than 1; the second multicarrier symbol is the multicarrier symbol among the P1 multicarrier symbols which is located behind the first multicarrier symbol and has a minimum interval in time domain to the first multicarrier symbol; and time domain positions of the P1 multicarrier symbols are determined through a higher layer signaling; a start time of the second time window in time domain is not earlier than an end time when the first sequence is detected in the first time window; the first signaling is a physical layer signaling; and the K1 is a positive integer; the second signaling is used for determining a target time-frequency resource pool, the target time-frequency resource pool comprises K2 target RE sets, any one of the K1 alternative RE set(s) is one of the K2 target RE sets; and the K2 is a positive integer greater than the K1; the target time-frequency resource pool is one CORESET; the alternative time-frequency resource pool includes partial of time domain resources occupied by the target time-frequency resource pool; the K1 alternative RE sets are a subset of the K2 target RE sets; any one of the K1 alternative RE set(s) is one PDCCH candidate corresponding to one time of blind detection of the first signaling.

10. The UE according to claim 9, wherein the first transceiver operates a first radio signal; the operating is receiving, or the operating is transmitting; the first signaling comprises a first configuration information group for the first radio signal, and the first configuration information group comprises at least one of positions of occupied time domain resources, positions of occupied frequency domain resources, or an MCS;
or, the first receiver receives a third signaling; the third signaling is used for determining L1 candidate time units, and the L1 candidate time units all belong to the first time window; time domain resources occupied by the first sequence belong to one of the L1 candidate time units;
and the UE monitors the first sequence in the L1 candidate time units.

11. The UE according to claim 9, wherein
a first identifier is used for determining the K1 alternative RE set(s) from the alternative time-frequency resource pool; the first identifier is a Cell-RNTI; the UE determines positions of REs occupied by any one of the K2 target RE sets from the first time window according to the first identifier, and then determines a start time of the alternative time-frequency resource pool through the first sequence; the K2 target RE sets include K1 target RE sets, REs occupied by any one of the K1 target RE sets all belong to the alternative time-frequency resource pool, and the K1 target RE sets are the K1 alternative RE sets respectively.

12. The UE according to claim 9, wherein a maximum number of blind detections of the first signaling performed by the UE in the first time window is equal to X1; and the X1 is a positive integer less than the K2 but not greater than the K1.

13. A base station for wireless communication, comprising:
a second transceiver, to transmit a second signaling; to transmit a first sequence in a first time window; and
a third transceiver, to transmit a first signaling on one of K1 alternative RE set(s);
wherein any one of the K1 alternative RE set(s) comprises a positive integer number of RE(s), each RE comprised in the any one of the K1 alternative RE set(s) belongs to an alternative time-frequency resource pool, the alternative time-frequency resource pool belongs to a second time window in time domain; a receiver of the first sequence includes a UE; the first sequence is detected by the UE in a first multicarrier symbol, and the start time of the alternative time-frequency resource pool is a second multicarrier symbol; the first multicarrier symbol belongs to the first time window, and the second multicarrier symbol belongs to the second time window; the second multicarrier symbol is one of P1 multicarrier symbols, the P1 being a positive integer greater than 1; the second multicarrier symbol is the multicarrier symbol among the P1 multicarrier symbols which is located behind the first multicarrier symbol and has a minimum interval in time domain to the first multicarrier symbol; and time domain positions of the P1 multicarrier symbols are determined through a higher layer signaling; a start time of the second time window in time domain is not earlier than an end time when the first sequence is detected in the first time window; the first signaling is a physical layer signaling; and the K1 is a positive integer; the second signaling is used for determining a target time-frequency resource pool, the target time-frequency resource pool comprises K2 target RE sets, any one of the K1 alternative RE set(s) is one of the K2 target RE sets; and the K2 is a positive integer greater than the K1; the target time-frequency resource pool is one CORESET; the alternative time-frequency resource pool includes partial of time domain resources occupied by the target time-frequency resource pool; the K1 alternative RE sets are a subset of the K2 target RE sets; any one of the K1 alternative RE set(s) is one PDCCH candidate corresponding to one time of blind detection of the first signaling.

14. The base station according to claim 13, wherein the third transceiver processes a first radio signal; the processing is transmitting, or the processing is receiving; the first signaling comprises a first configuration information group for the first radio signal, and the first configuration information group comprises at least one of positions of occupied time domain resources, positions of occupied frequency domain resources, or an MCS;

or, the second transceiver transmits a third signaling; wherein the third signaling is used for determining L1 candidate time units, and the L1 candidate time units all belong to the first time window; time domain resources occupied by the first sequence belong to one of the L1 candidate time units; a receiver of the first signaling comprises a first terminal, and the first terminal monitors the first sequence in the L1 candidate time units.

15. The base station according to claim 13, wherein
a first identifier is used for determining the K1 alternative RE set(s) from the alternative time-frequency resource pool; the first identifier is a Cell-RNTI; the UE determines positions of REs occupied by any one of the K2 target RE sets from the first time window according to the first identifier, and then determines a start time of the alternative time-frequency resource pool through the first sequence; the K2 target RE sets include K1 target RE sets, REs occupied by any one of the K1 target RE sets all belong to the alternative time-frequency resource pool, and the K1 target RE sets are the K1 alternative RE sets respectively.

16. The base station according to claim 13, wherein the second transceiver performs an energy detection of a first frequency band; the energy detection is used for determining that the first frequency band is unoccupied, and frequency domain resources occupied by the first signaling belong to the first frequency band.

* * * * *